(12) United States Patent
Bonovich et al.

(10) Patent No.: US 10,820,059 B1
(45) Date of Patent: *Oct. 27, 2020

(54) SYSTEMS AND METHODS FOR SPOTTED ADVERTISING AND CONTROL OF CORRESPONDING USER INTERFACES AND TRANSACTIONS VIA USER RECEIVING DEVICES AND MOBILE DEVICES

(71) Applicant: The DIRECTV Group, Inc., El Segundo, CA (US)

(72) Inventors: Earl James Bonovich, Tinley Park, IL (US); Don E. Cansino, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,855

(22) Filed: Jun. 4, 2019

Related U.S. Application Data

(63) Continuation of application No. 14/592,838, filed on Jan. 8, 2015, now Pat. No. 10,356,478.

(51) Int. Cl.
*H04N 21/475* (2011.01)
*H04N 21/81* (2011.01)
(Continued)

(52) U.S. Cl.
CPC ..... *H04N 21/4758* (2013.01); *G06Q 30/0241* (2013.01); *G06Q 30/0601* (2013.01);
(Continued)

(58) Field of Classification Search
CPC ......... H04N 21/4758; H04N 21/44222; H04N 21/435; H04N 21/8173; H04N 21/6143;
(Continued)

(56) References Cited

U.S. PATENT DOCUMENTS

| 5,929,849 | A | 7/1999 | Kikinis |
| 6,282,713 | B1 | 8/2001 | Kitsukawa et al. |
| 2007/0021973 | A1* | 1/2007 | Stremler ............... G06Q 10/10 705/1.1 |

(Continued)

FOREIGN PATENT DOCUMENTS

| EP | 2405389 A1 | 1/2012 |
| WO | WO-00038428 A1 | 6/2000 |

OTHER PUBLICATIONS

International Search Report and Written opinion dated Apr. 7, 2016 in international application No. PCT/US2016/012228 filed Jan. 5, 2016 by Woei-Shyang Yee et al.

(Continued)

*Primary Examiner* — Hai V Tran
*Assistant Examiner* — Tien M Nguyen
(74) *Attorney, Agent, or Firm* — Guntin & Gust, PLC; Jay Anderson

(57) ABSTRACT

A user receiving device includes at least one transceiver module that receives a video and an ad. The ad is played out as part of the video is for a product or service. An output module displays the video and the ad on a display. The display is associated with the user receiving device. A transaction module initiates a purchase transaction based on an initiation signal and, after initiating the purchase transaction, displays an additional offer based on a purchasable object corresponding to the ad or a stored customer history. The transaction module generates an offer response to the additional offer and receives a confirmation response based on the offer response.

19 Claims, 20 Drawing Sheets

(51) Int. Cl.
*G06Q 30/02* (2012.01)
*G06Q 30/06* (2012.01)
*H04N 21/442* (2011.01)
*H04N 21/433* (2011.01)
*H04N 21/61* (2011.01)
*H04N 21/435* (2011.01)

(52) U.S. Cl.
CPC ....... *H04N 21/435* (2013.01); *H04N 21/4331* (2013.01); *H04N 21/44222* (2013.01); *H04N 21/6143* (2013.01); *H04N 21/812* (2013.01); *H04N 21/8173* (2013.01)

(58) Field of Classification Search
CPC ............. H04N 21/4331; H04N 21/812; H04N 21/4126; H04N 21/431; H04N 21/43637; H04N 21/472; H04N 21/475; H04N 21/478; G06Q 30/0241; G06Q 30/0601
See application file for complete search history.

(56) References Cited

U.S. PATENT DOCUMENTS

| | | | |
|---|---|---|---|
| 2002/0059604 A1 | 5/2002 | Papagan et al. | |
| 2002/0078441 A1 | 6/2002 | Drake et al. | |
| 2002/0129368 A1* | 9/2002 | Schlack | G06Q 30/02 725/46 |
| 2003/0002862 A1 | 1/2003 | Rodriguez et al. | |
| 2004/0133909 A1 | 7/2004 | Ma | |
| 2004/0153385 A1* | 8/2004 | Allibhoy | G06Q 20/027 705/35 |
| 2005/0235307 A1* | 10/2005 | Relan | H04N 21/25875 725/14 |
| 2008/0189172 A1* | 8/2008 | Goren | G06Q 30/02 705/14.23 |
| 2008/0253739 A1* | 10/2008 | Livesey | H04N 7/17318 386/241 |
| 2008/0255961 A1 | 10/2008 | Livesey | |
| 2009/0094113 A1 | 4/2009 | Berry et al. | |
| 2009/0183199 A1 | 7/2009 | Stafford et al. | |
| 2009/0216745 A1 | 8/2009 | Allard | |
| 2009/0228920 A1* | 9/2009 | Tom | G06Q 10/0637 725/35 |
| 2009/0239514 A1 | 9/2009 | Kenagy et al. | |
| 2010/0061709 A1 | 3/2010 | Agnihotri et al. | |
| 2010/0063857 A1 | 3/2010 | Malik | |
| 2010/0145820 A1 | 6/2010 | Johnson et al. | |
| 2010/0154007 A1 | 6/2010 | Touboul et al. | |
| 2011/0103763 A1 | 5/2011 | Tse et al. | |
| 2012/0079518 A1* | 3/2012 | Wan | H04H 60/45 725/14 |
| 2013/0042272 A1 | 2/2013 | Miroshnychenko | |
| 2013/0226657 A1 | 8/2013 | Bohe et al. | |
| 2013/0276008 A1 | 10/2013 | Wu et al. | |
| 2014/0058897 A1 | 2/2014 | Yang et al. | |
| 2014/0100993 A1 | 4/2014 | Farmer | |
| 2014/0105567 A1 | 4/2014 | Casagrande et al. | |
| 2014/0282723 A1* | 9/2014 | Sinha | H04H 60/40 725/35 |
| 2014/0359644 A1 | 12/2014 | Kumar et al. | |

OTHER PUBLICATIONS

International Search Report and Written Opinion dated Mar. 24, 2016 in international application PCT/US2016/012227 filed Janaury 5, 2016 by Earl J. Bonovich et al.

* cited by examiner

Purchasing Dialogue Window — 631

Back | Image of Product | Continue

Price Per Unit      $X.XX

Quantity      Y

Product Details: _____

Product Reviews: _____

FIG. 12

Confirmation Dialogue Window — 633

Back | Image of Product | Confirm

Price Total      $XX.XX
Total Ordered      Y
Shipping Costs      $ZZ.ZZ

Customer Information:      Address
     Phone Number

Billing Information:      Address
     Phone Number

Payment Information:      Billing Account #

FIG. 13

SYSTEMS AND METHODS FOR SPOTTED ADVERTISING AND CONTROL OF CORRESPONDING USER INTERFACES AND TRANSACTIONS VIA USER RECEIVING DEVICES AND MOBILE DEVICES

CROSS-REFERENCE TO RELATED APPLICATIONS

This application is a continuation of U.S. application Ser. No. 14/592,838, filed on Jan. 8, 2015. The entire disclosures of the above applications are incorporated herein by reference.

TECHNOLOGY FIELD

The present disclosure relates generally to television systems and, more specifically, to systems and methods for controlling advertising, upselling, cross-selling, and purchasing of products and services via user receiving devices and mobile devices.

BACKGROUND

The statements in this section merely provide background information related to the present disclosure and may not constitute prior art.

Satellite television has become increasingly popular due to a wide variety of content and the quality of content available. A satellite television system typically includes a set top box that is used to receive satellite signals and decode the satellite signals for use on a television. The set top box typically has a memory associated therewith. The memory may include a digital video recorder or the like as well as storage for an operating code of the set top box.

Content providers provide a variety of content to consumers. Available content is typically received at a set top box (or user receiving device) and displayed to the user using a guide. The guide typically includes channels and timeslots as well as programming information for each information timeslot. The programming information may include the content title and other identifiers such as actor information and the like. The user selects a channel via the guide and the set top box (STB) then displays the channel on a display (e.g., a television).

Customers (or users) of a service provider can subscribe to various packages. Each of the packages provides access to a certain set of channels. The customers call the service provider to establish an account with the service provider. While setting up an account, a customer selects a package and provides billing information to the service provider. The customer is then able to access channels in the selected package.

In addition to the channels in a selected package that a customer is signed up to receive, the customer may also receive additional content. This may include the customer selecting a channel, program and/or video via the STB and/or again calling the service provider to request for the selected channel, program and/or video. For example, a customer may request a video, obtain authorization to receive the video, and receive the video at a STB of the customer. This is often referred to as pay-per-view (PPV). The video is transmitted to the STB and may then be displayed on a display (or television) of the STB. The customer may control when the video is displayed.

In addition to content provided as part of a selected package and PPV content, product and/or service content may be provided. For example, content providers may broadcast advertisements (referred to sometimes as commercials) for certain products and services available from various third parties. The advertisements may interrupt, for example, programs being viewed by users of a STB.

SUMMARY

The present disclosure provides systems and methods for providing content access based on quick response codes and text messages.

In one aspect of the disclosure, a user receiving device is provided and includes at least one transceiver module, an output module, a control module, and a transaction module. The at least one transceiver module is configured to receive an ad or an offer transmitted from at least one backend device to the user receiving device. The offer is directed to a product and/or service referred to in the ad. The output module is configured to display the ad or the offer on a display. The display is connected to the user receiving device. The at least one transceiver module is configured to receive a response signal transmitted from a mobile device to the user receiving device. The response signal is in response to the offer. The transaction module is configured to perform a transaction between the at least one backend device and a user of the mobile device based on the response signal.

In another aspect of the disclosure, a user receiving device is provided and includes at least one transceiver module, an output module, and a control module. The at least one transceiver module is configured to receive a video file and metadata from a first backend device. The metadata indicates where in the video file an object is shown in an image of the video file. The output module is configured to playout a video of the video file on a display, wherein the display is connected to the user receiving device. The control module is configured to monitor the metadata while the video is being playout to detect the object and alter a portion of the image of the video to indicate to a viewer of the video that the object is purchasable.

In another aspect of the disclosure, a user receiving device is provided and includes at least one transceiver module, an output module, and a control module. The at least one transceiver module is configured to receive a file from a first backend device. The file indicates where in a video an object is shown. The output module is configured to playout the video on a display. The display is connected to the user receiving device. The control module is configured to monitor data in the file while the video is being played out to detect the object, and generate a signal to indicate on the display that the object is purchasable.

In another aspect of the disclosure, a user receiving device is provided and includes at least one transceiver module, an output module, and a control module. The at least one transceiver module is configured to receiving a shopping program from a first backend device. The output module is configured to display the shopping program on a display, wherein the display is connected to the user receiving device. The control module is configured to perform image recognition on images of the shopping program to detect an object for sale and enable purchasing of the object via the user receiving device. The at least one transceiver module is configured to receive a request signal from a mobile device. The control module is configured to, based on the request signal, facilitate a transaction for the object between a viewer of the mobile device and the first backend device or a second backend device.

In another aspect of the disclosure, a user receiving device is provided and includes at least one transceiver module, an output module, and a control module. The at least one transceiver module is configured to receive metadata and a program or video from a first backend device. The metadata indicates where in the program or video a spotted ad is included. The output module is configured to display the program or video on a display. The display is connected to the user receiving device. The at least one transceiver module is configured to receive a request signal from a mobile device. The request signal indicates a viewer of the video has detected the spotted ad. The control module is configured to, based on the request signal, save information pertaining to the request signal, open a dialogue window or initiate a survey.

In another aspect of the disclosure, a method of operating a user receiving device is provided. The method includes: receiving an ad or an offer transmitted from at least one backend device to the user receiving device, where the offer is directed to a product and/or service referred to in the ad; displaying the ad or the offer on a display, where the display is connected to the user receiving device; receiving a response signal transmitted from a mobile device to the user receiving device, where the response signal is in response to the offer; and performing a transaction between the at least one backend device and a user of the mobile device based on the response signal.

In another aspect of the disclosure, a method of operating a user receiving device is provided and includes: receiving a video file and metadata from a first backend device, where the metadata indicates where in the video file an object is shown in an image of the video file; playing out a video of the video file on a display, where the display is connected to the user receiving device; monitoring the metadata while the video is being playout to detect the object; and altering a portion of the image of the video to indicate to a viewer of the video that the object is purchasable.

In another aspect of the disclosure, a method of operating a user receiving device is provided and includes: receiving a file from a first backend device, where the file indicates where in a video an object is shown; playing out the video on a display, where the display is connected to the user receiving device; monitoring data in the file while the video is being played out to detect the object; and generating a signal to indicate on the display that the object is purchasable.

In another aspect of the disclosure, a method of operating a user receiving device is provided and includes: receiving a shopping program from a first backend device; displaying the shopping program on a display, where the display is connected to the user receiving device; performing image recognition on images of the shopping program to detect an object for sale and enable purchasing of the object via the user receiving device; receiving a request signal from a mobile device; and based on the request signal, facilitating a transaction for the object between a viewer of the mobile device and the first backend device or a second backend device.

In another aspect of the disclosure, a method of operating a user receiving device is provided and includes: receiving metadata and a program or video from a first backend device, where the metadata indicates where in the program or video a spotted ad is included; displaying the program or video on a display, where the display is connected to the user receiving device; receiving a request signal from a mobile device, and where the request signal indicates a viewer of the video has detected the spotted ad; and based on the request signal, saving information pertaining to the request signal, open a dialogue window or initiate a survey.

In yet another aspect of the disclosure, a user receiving device includes at least one transceiver module that receives a video and an ad. The ad is played out as part of the video is for a product or service. An output module displays the video and the ad on a display. The display is associated with the user receiving device. A transaction module initiates a purchase transaction based on an initiation signal and, after initiating the purchase transaction, displays an additional offer based on a purchasable object corresponding to the ad or a stored customer history. The transaction module generates an offer response to the additional offer and receives a confirmation response based on the offer response.

In another aspect of the disclosure, a method of operating a user receiving device comprises receiving a video and an ad wherein the ad is played out as part of the video, wherein the ad is for a product or service, displaying the video and the ad on display wherein the display is associated with the user receiving device, initiating a purchase transaction based on an initiation signal, after initiating the purchase transaction, displaying an additional offer based on a purchasable object corresponding to the ad or a stored customer history, the transaction module generating an offer response to the additional offer and receiving a confirmation response based on the offer response.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 12 is a purchasing dialogue window in accordance with the present disclosure.

FIG. 13 is a confirmation dialogue window in accordance with the present disclosure.

DETAILED DESCRIPTION

A set-top-box (STB) may receive an audio/video input signal via a cable network or a satellite and direct the audio-video input to a television (or other display). A user may interact with the STB via a remote control device, a cellular phone or other mobile device in order to view a guide and/or programs on the television and manage usage of the STB. The terms "user", "viewer", and "customer" are used herein interchangeably and may refer to the same person. Transactions between the user and a service provider may be performed via the STB and the mobile device. The transactions may be associated with services being provided by the service provider to the STB. The services may include, for example, programs, videos, and/or pay-per-view (PPV) products. Traditionally, commercial advertising includes broadcasting and displaying advertisements to users. The users then needed to take the initiative to (i) remember the advertisements, corresponding products and/or services, and related information, and (ii) at a later date, look up, call and/or visit a vendor of the products and/or services in order to purchase the products and/or services. This may include visiting a vendor store to purchase the advertised products.

The following disclosed examples allow advertisers to present purchasable products and/or services and corresponding offers to users on displays of STBs, user receiving devices, mobile devices, etc. The users may inquire about the products and/or services and accept the offers and/or other offers via the STBs, user receiving devices, mobile devices, etc. The products and/or services may be shown in ads and/or in programs, videos, etc. The offers may be accepted in real time (i.e. as the offers are presented to the users). The STBs, user receiving devices and mobile devices are configured to facilitate transactions between users (or customers) and backend devices associated with advertisers, content providers, service providers, etc. The backend devices may include head ends, content providers, service providers and corresponding servers. The backend devices may also include advertiser servers.

As an example, the head ends, content providers, and service providers may provide various types of content including programs, videos, and PPV content. Advertisers may advertise products (e.g., consumer products), services (e.g., residential or business services, legal services, medical services, etc.), programs (e.g., broadcast channels, concerts, sporting events, etc.), videos, PPV content (e.g., videos, sporting events, etc.), and/or other items that can be advertised. The products may include the programs, videos, PPV content, and/or other content. The consumer products may include food and/or drink products, residential products, business products, vehicles, and/or other products. The advertisements may advertise content provided by a content provider and/or products and services offered for purchase by other product and/or service providers.

Figure 1:
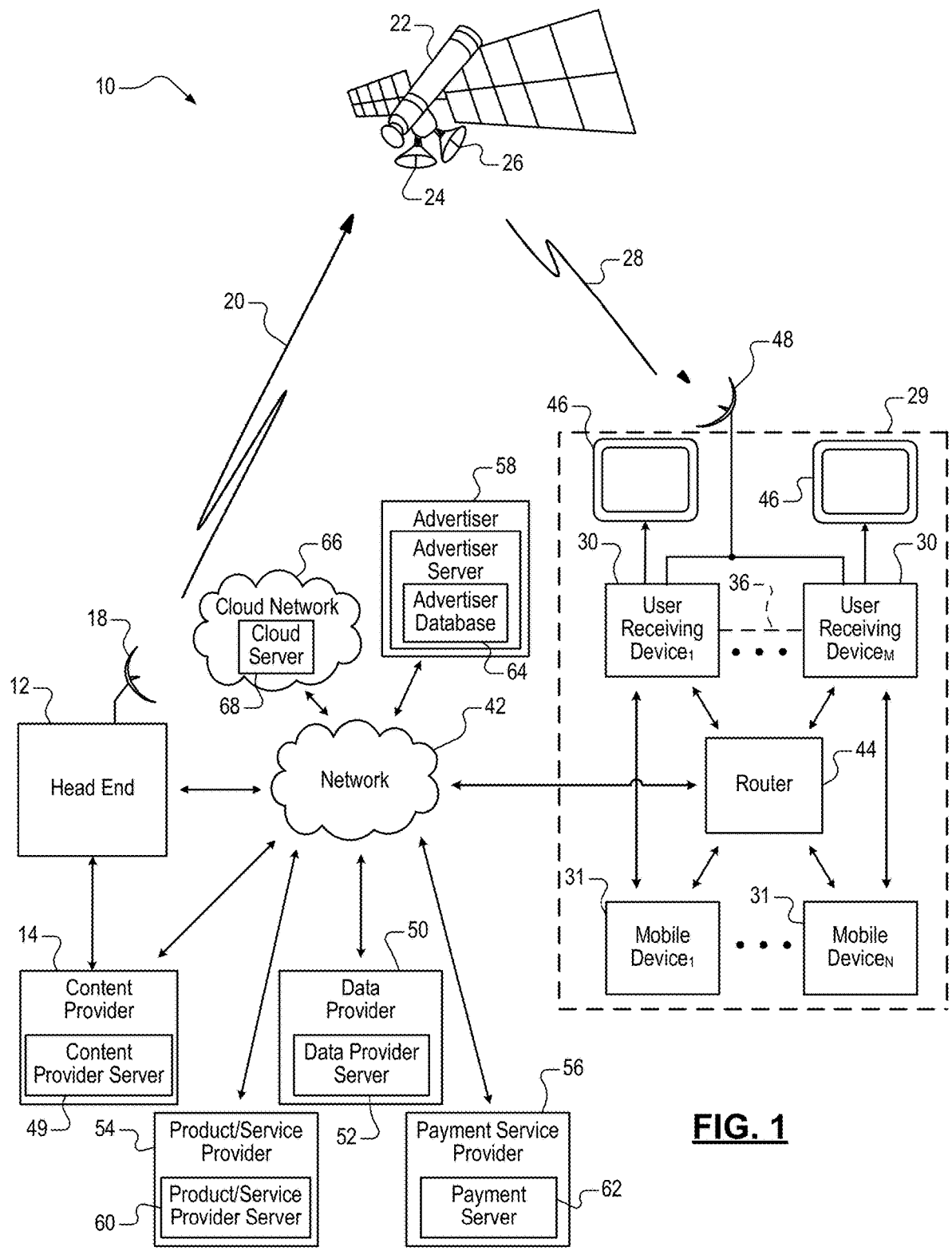
FIG. 1 is a functional block diagram of a communication system in accordance with the present disclosure.

FIG. 1 shows a communication system 10 that includes a head end 12. The head end 12 operates as a content processing system and a transmission source. The head end 12 may also be used for distributing content and providing billing data. The details of the head end 12 will be further described below with respect to FIG. 2.

One or more content providers 14, only one of which is illustrated in FIG. 1, may provide content and data related to the content such as metadata to the head end 12. The content providers 14 may individually and/or collectively be referred to as a content service provider. The content may include channels, programs, videos and/or other content. The metadata may include ratings data. Ratings data may include Motion Picture Association ratings such as G, PG, PG-13, R, NC-17 and X. Ratings data may also include television ratings such as TV-Y, TV-Y7, TV-G, TV-PG, TV-14, and TV-MA. Of course, different countries may have different rating systems. The head end 12 receives various types of content and data from the content provider 14 and communicates the content to various user devices associated with the system.

The head end 12 may communicate content to users in various manners including a satellite system and through terrestrial networks. Carrying through with the satellite example, the head end 12 includes an antenna 18 for communicating process content through uplink signals 20 to a satellite 22. The satellite 22 may include a receiving antenna 24 and a transmitting antenna 26. The receiving antenna 24 receives the uplink signals 20 from the satellite antenna 18. The transmitting antenna 26 generates downlink signals 28 and communicates the downlink signals 28 to various user receiving devices 30 and/or mobile devices 31. The user receiving devices 30 may be implemented as and/or include set top boxes.

The head end 12 may be connected to the user receiving devices 30 via the network 42 and/or the router 44. The network 42 may be a single network or a combination of different types of networks. For example, the network 42 may be a broadband wired network, a digital subscriber line (DSL) network, and/or a wireless network. A broadband wired network may be an Ethernet network or a phone line network. The network 42 may be a one-way network such that data may be communicated from the user receiving devices 30 to the head end 12. The network 42 may also be a two-way network that delivers content from the head end 12 in response to selection signals communicated from the user receiving devices 30. The network 42 may be in communication with the local area network 36. The network 42 may include an Internet.

The user receiving devices 30 may include and/or be connected to displays 46 (e.g., televisions), as shown. The displays 46 may display both video signals and output audio signals. The user receiving devices 30 may be referred to as fixed (or non-mobile) user devices because the user receiving devices are intended to be used from a fixed position on the surface of the earth. The user receiving devices 30 may include circuitry to tune, decode and store content therein. Details of the user receiving devices 30 are further described below.

The user receiving devices 30 may be in communication with each other through a network 36 such as a local area network. Content may be stored in one or more of the user receiving devices 30 and/or in a memory separate from the user receiving devices 30 and accessed by the user receiving devices 30. The content may be shared by and/or transmitted between the user receiving devices 30. The user receiving devices 30 may be located in respective rooms of a building (an example of which is designated 29), such as a home, multi-unit dwelling or business. The content may be delivered to two or more of the user receiving devices 30 during a same period of time in a multi-room viewing function. The user receiving devices 30 may be associated with one or more accounts.

The user receiving devices 30 are in communication with an antenna 48. The antenna 48 receives the downlink signals 28. Thus, the user receiving devices 30 may be referred to as satellite television receiving devices. However, the system has applicability in non-satellite applications, such as in wired or wireless terrestrial systems. The user receiving devices 30 may be included in and/or implemented as televisions, set top boxes, and/or set back boxes and thus may be referred to as fixed (or non-mobile devices). The user receiving devices 30 may be referred to as televisions, set top boxes, and/or set back boxes. The user receiving devices 30 may be interconnected.

The user receiving devices 30 may be connected to the router 44 and/or may be in communication with the network 42 and the mobile devices 31. The mobile devices 31 may be cellular phones, smart phones (i.e. have Internet access), dumb phones (i.e. do not have Internet access), tablets, laptops, wearable device, etc. A wearable device may be one of a number of types of devices that are worn by a user. A wearable device may be fixed wearable by a user meaning the wearable device is meant to be fixed to the user. Examples of wearable devices include a computerized watch such as a Samsung® or Apple® watch. The watch devices are fixed to an arm of the user. Another example of a wearable device is GOOGLE GLASS®, which is fixed to a head of a user. Of course, other types of wearable devices affixed to other parts of the body may be used. A wearable device may be in direct communication with the user receiving devices 30 through Bluetooth® connections. As described below, the user receiving devices 30 and the mobile devices 31 may include Bluetooth® transceivers (referred to as radios). The mobile devices 31 may also be in communication with the user receiving devices 30 via Internet protocol (IP) connections and/or the router 44. The mobile devices 31 may also be in communication with devices (e.g., the head end 12) outside the local area network via the router 44 and/or the network 42. As used herein, a mobile device may refer to a mobile phone, a tablet, a remote control device, a wearable device, etc.

The router 44 may be a wireless router or a wired router or a combination of the two. For example, the user receiving devices 30 may be wired to the router 44 and wirelessly coupled to the mobile devices 31. The router 44 may communicate IP signals to the user receiving devices 30. The IP signals may be used for controlling various functions of the user receiving devices 30. IP signals may also originate from the user receiving devices 30 and be transmitted to the mobile device 31.

Figure 5:
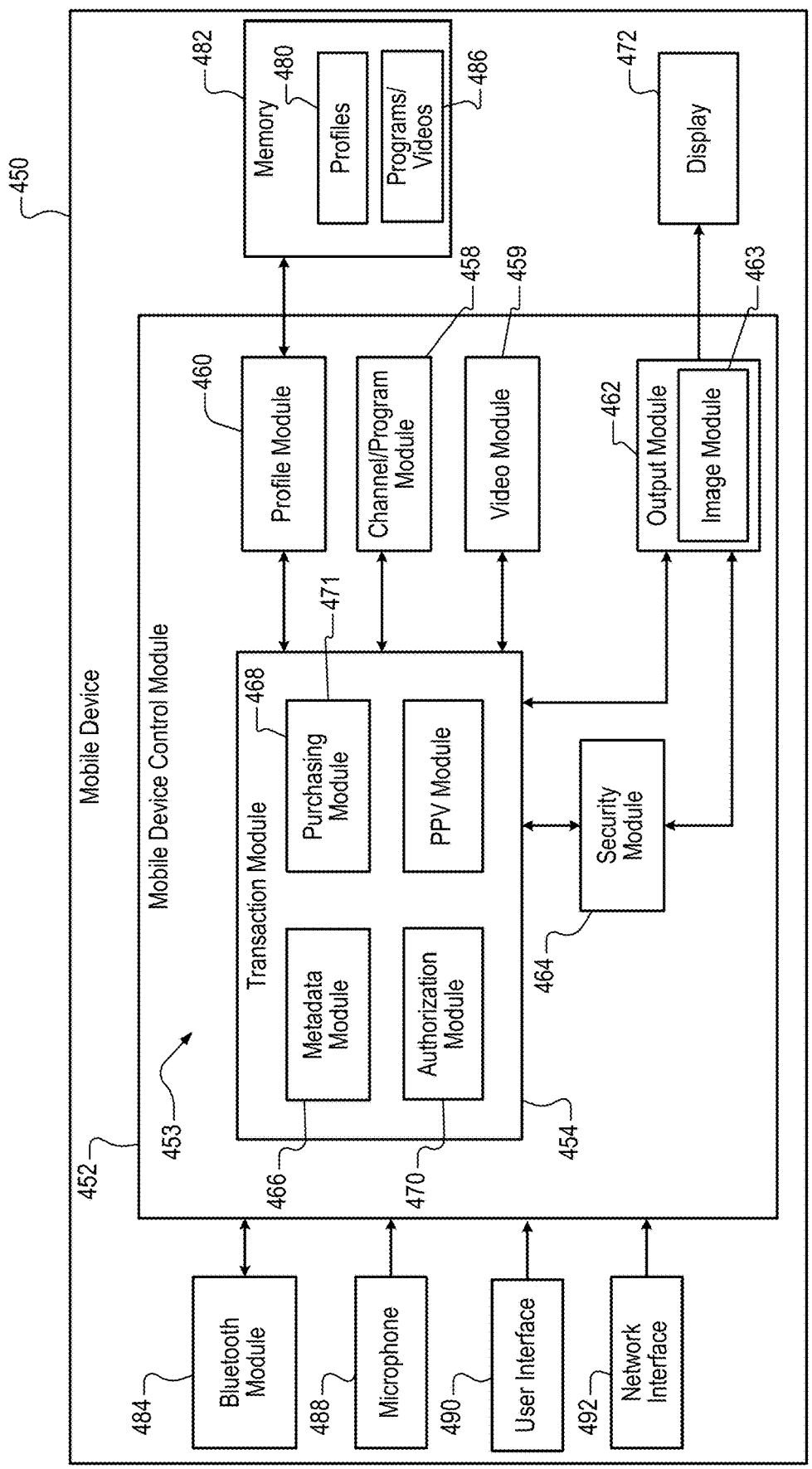
FIG. 5 is a functional block diagram of a mobile device in accordance with the present disclosure.

The mobile devices 31 may also have displays, an example of which is shown in FIG. 5. The displays of the mobile devices 31 may display video and output audio signals. The displays may be touch screens that act as user interfaces. Other types of user interfaces on the mobile devices 31 may include buttons and switches.

The network 42 may, for example, be a public switched telephone network, the Internet, a mobile telephone network or other type of network. The network 42 may be in direct wireless communication with the mobile device 31 via a cellular system and/or may be in indirect communication with the mobile devices 31 via the router 44 and/or the user receiving devices 30.

The content provider 14 provides content to the head end 12. Although only one content provider 14 is illustrated, more than one content provider may be incorporated in the system 10. The head end 12 distributes the content through the satellite 22 and/or the network 42 to the user receiving devices 30 and/or the mobile device 31. The content provider 14 may include and/or be implemented as content provider server 49.

A data provider 50 may also provide data to the head end 12. The data provider 50 may provide various types of data such as schedule data or metadata that is provided within the program guide system. The metadata may include various descriptions, actor, director, star ratings, titles, user ratings, television or motion picture parental guidance ratings, descriptions, related descriptions and various other types of data. The data provider 50 may provide the data directly to the head end and may also provide data to various devices such as the mobile device 31 and the user receiving device 30 through the network 42. This may be performed in a direct manner through the network 42. The data provider 50 may include and/or be implemented as a data provider server 52.

The communication system 10 may further include a product and/or service provider 54, a payment service provider 56, an advertiser 58. The product and/or service provider 54, the payment service provider 56 and/or the advertiser 58 may respectively include and/or be implemented as a product and/or service provider server 60, a payment server 62 and/or an advertiser server 64. The product and/or service provider server 60 may offer for sale products (e.g., non-content products, consumer products) and/or offer services (e.g., residential and/or business services, legal services, medical services, etc.) to users of the user receiving devices 30 and/or mobile devices 31. The payment server 62 may interact with the user receiving devices 30 and/or the mobile devices 31 to facilitate presenting offers, receiving acceptance of the offers and confirmation of the acceptance. The advertiser server 64 may include an advertiser database 65 and may present offers for products and/or services to the user receiving devices 30 and the mobile devices 31. The servers 49, 52, 60, 62 and 64 may communicate with the user receiving devices 30 and mobile devices via the network 42 and/or router 44.

The communication system 10 may also include a cloud network 66 (referred to as "the cloud"). The cloud network may include a cloud server 68. The cloud server 68 may store various types if information and/or data which may be accessible by the head end 12, the servers 49, 52, 60, 62, 64, the user receiving devices 30 and the mobile devices 31. The various types of information and data may include, for example, user information, billing information, offers, ads including upsell and/or cross-sell ads, object (product and/or service) information, etc.

Figure 2:
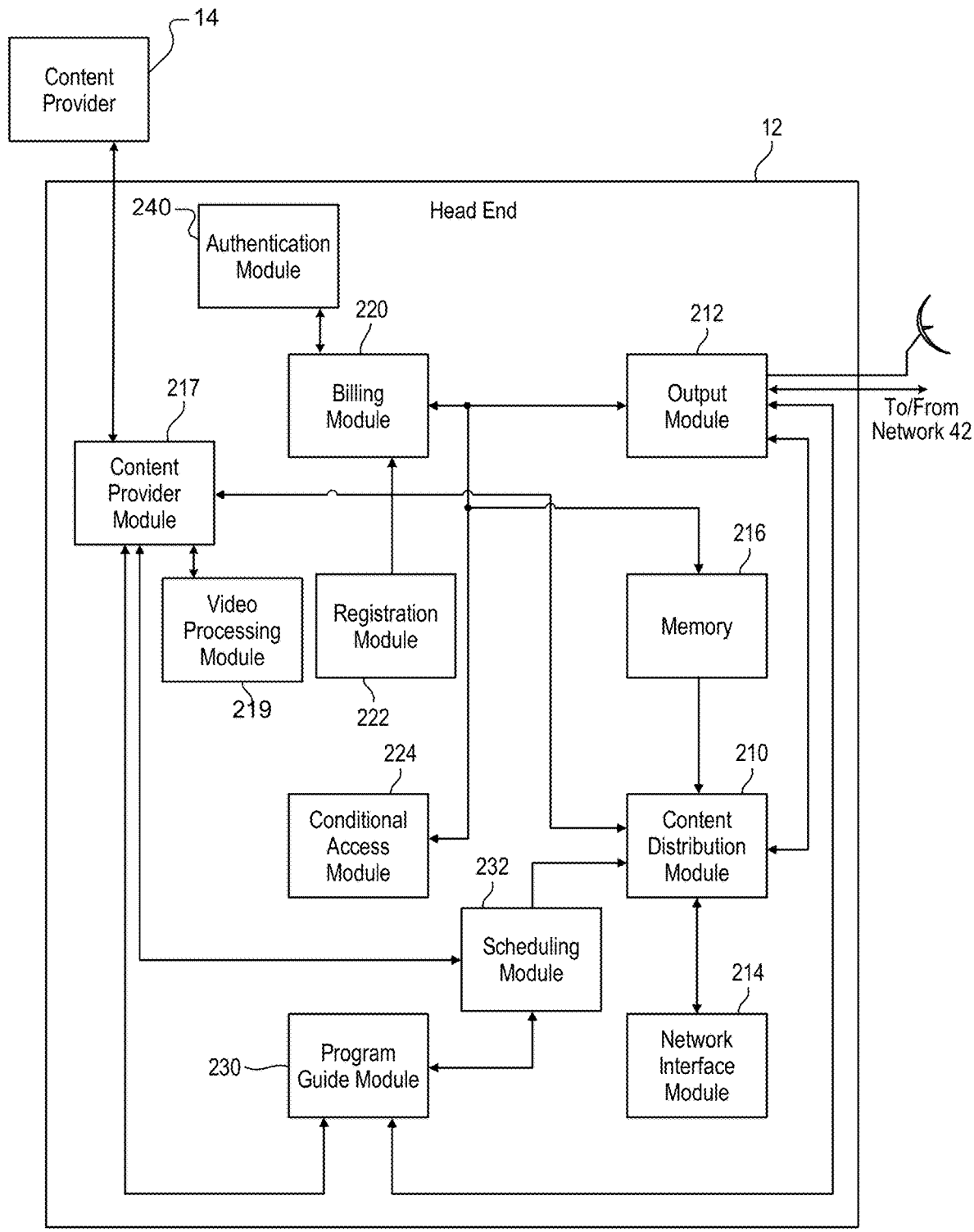
FIG. 2 is a functional block diagram of a head end in accordance with the present disclosure.

FIG. 2 shows the head end 12. It should be noted that the head end 12 is illustrated as a single device or facility, but may refer to multiple devices and/or facilities. That is, each of the individual components illustrated within the head end 12 may be physically located in various locations. The head end 12, one or more of the modules of the head end 12, and/or the memory of the head end 12 may be included in the content provider 14.

The head end 12 may include a content distribution module 210 that is used for distributing content through different means. The head end 12 may be in communication with an output module 212 for uplinking content to a satellite through the uplink antenna 18 as illustrated in FIG. 1 and/or transmitting signals to and/or receiving signals from the network 42. The output module may include and/or be implemented as an interface and/or a transceiver. The content distribution module 210 may thus format the signal in an appropriate format for uplinking through the output module 212. The output module 212 may uplink various content through the satellite to the user receiving devices 30 and/or the mobile devices 31 (collectively referred to as receiving devices) of FIG. 1. The content distribution module 210 may also transcode the content in formats suitable for use by the receiving devices.

The output module 212 may also communicate conditional access data to the receiving devices for accessing the content. The conditional access data may be communicated in a conditional access packet that includes data for tuning the receiving devices to receive the data. The conditional access data may be received directly or indirectly from a conditional access module 224. The conditional access module 224 may provide conditional access signals to a billing module 220 to allow a particular user access to content. The conditional access module 224 may generate a conditional access packet (CAP) together with data from the billing module 220 for uplinking through the output module 212. If the content is satellite content, access data such as, but not limited to, the particular transponder, channel and time at which the content is broadcasted may be provided in the CAP. If the content is to be provided over an Internet or other broadband-type network, an IP address of the content may be provided. The CAP may also include encryption/decryption information for the receiving devices to receive the content and decode the content.

The content distribution module 210 may also be in communication with a network interface module 214. The network interface module 214 may be in communication with the network 42 (shown in FIG. 1) for communicating content therethrough. The network interface module 214 (or the content distribution module 210) may format the content signals into internet protocol signals for distribution through the network 42.

The content distribution module 210 may also be in communication with content memory 216. The content memory 216 may be referred to as a content repository. The content memory 216 may receive content from a content providing module 217 for distribution through the satellite system or the network 42. The content providing module 217 may receive content from the content provider 14. The content memory 216 may save on-demand or PPV content therein.

The content providing module 217 may also provide live television content for distribution through the content distribution module 210. The content distribution module 210 may thus communicate live content through the output module 212 or through the network interface module 214 to the appropriate networks. The content providing module 217 may provide content and/or ads to a video processing module 219, which may perform image recognition to detect products and generate corresponding metadata. This is described in further detail below.

The content providing module 217 processes received content for communication through the satellite 22 or network 42. The content providing module 217 may communicate live content as well as recorded content. The content memory 216 may store on-demand or PPV content for distribution at various times. The PPV content may be broadcasted in a linear fashion (at a predetermined time according to a predetermined schedule). Linear content may be presently broadcasted and may also be scheduled to be broadcasted in the future. The content memory 216 may also store on-demand content therein. On-demand content is content that is broadcasted at the request of a user receiving device and may occur at any time (not on a predetermined schedule). On-demand content is referred to as non-linear content.

A billing module 220 may also be incorporated into the head end 12. The billing module 220 may be used for associating one or more receiving devices with a user account. For example, different types of receiving devices such as mobile devices and one or more fixed set top boxes may be associated with a user account. By associating the receiving devices with a user account, content may be shared or accessed by each of the receiving devices associated with the account.

A registration module 222 may be used to associate each of the receiving devices with a user account at the billing module 220. The registration module 222 may be an automated system through which the user calls or accesses remotely by computer for associating the receiving devices with the account. The registration module 222 may also be partially human activated in which a customer service representative enters data for multiple receiving devices and associates the receiving devices with an account.

A program guide module 230 may also be included within the head end 12. The program guide module 230 receives metadata and other data from the content providing module 217. The program guide module 230 is ultimately used to communicate content and metadata to the output module 212. The program guide module may thus contain data related to the ratings of the particular content to be broadcasted and controlled by the content distribution module 210.

The program guide module 230 communicates program guide data to the user receiving devices 30 illustrated in FIG. 1. The program guide module 230 may create various objects with various types of data. The program guide module 230 may, for example, include schedule data, various types of descriptions for the content and content identifier that uniquely identifies each content item. The program guide module 230, in a typical system, communicates up to two weeks of advanced guide data for linear content to the user receiving devices. The guide data includes tuning data such as time of broadcast data, end time data, channel data, and transponder data name a few. Guide data may also include content available on-demand and pay-per-view content.

A scheduling module 232 may be in communication with the program guide module 230 and the content distribution module 210 to arrange the content to be distributed as well as provide program guide data for the content to be distributed. The scheduling module 232 may also be in communication with the content providing module 217 for obtaining a schedule for live channel broadcast.

An authentication module 240 may be used to authenticate various user receiving devices and mobile devices that communicate with the head end 12. The authentication module 240 may be in communication with a billing module 220. The billing module 220 may provide data for subscriptions and various authorizations suitable for the user receiving devices and the mobile devices. The authentication module 240 ultimately permits the user receiving devices and mobile devices to communicate with the head end 12. Authentication may be performed by providing a user identifier, a password, a user device identifier or combinations thereof. Channels and/or programs may be provided to the user receiving devices and/or mobile devices based on passcodes, as further described below.

Figure 3:
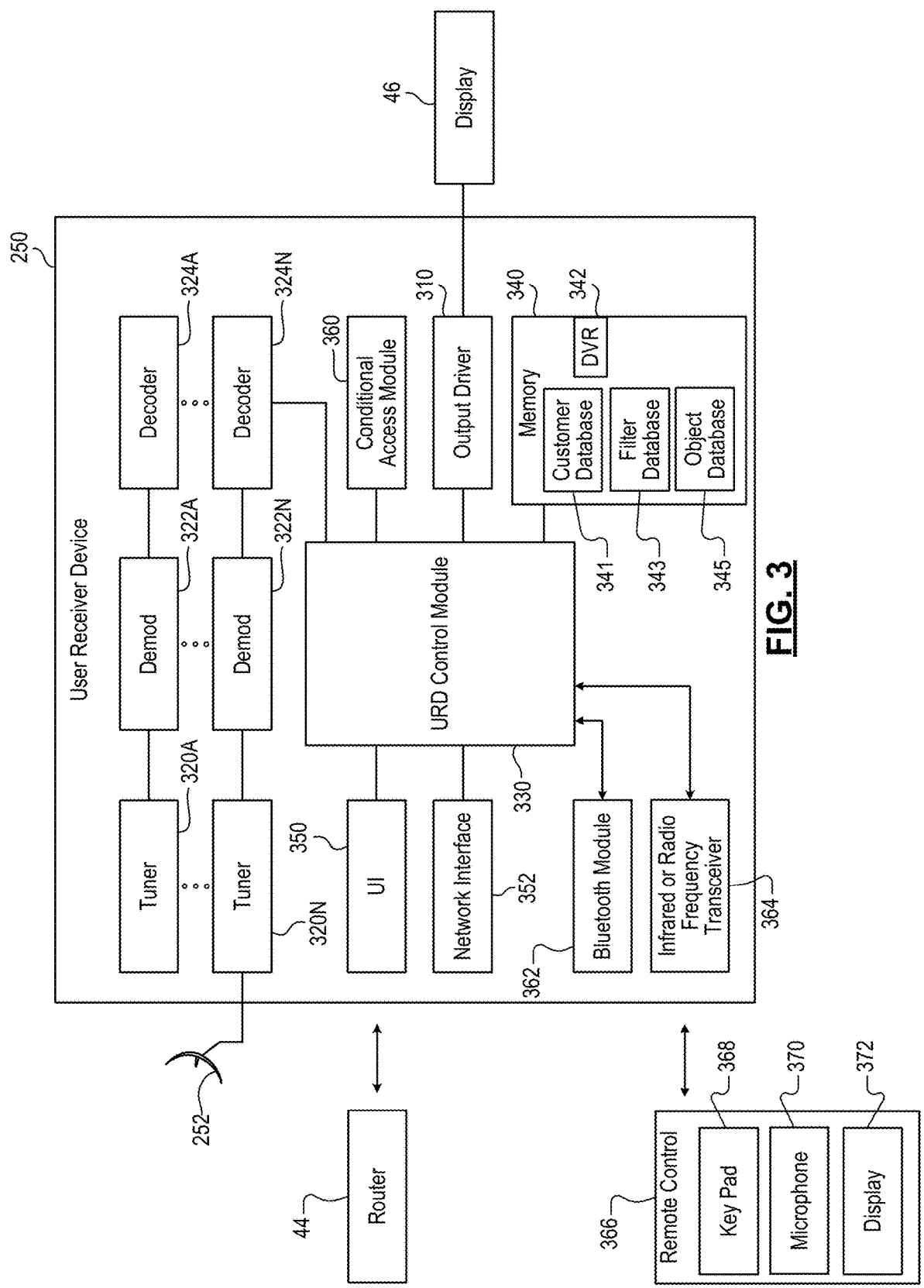
FIG. 3 is a functional block diagram of a user receiving device in accordance with the present disclosure.

FIG. 3 shows a user receiving device 250 that may replace any of the user receiving devices 30 of FIG. 1. Although, a particular example using the user receiving device 250 as a satellite set top box is illustrated, it is merely representative of various electronic devices with an internal control module (or controller) used as a content receiving device. An antenna 252 may be one of a number of different types of antennas used for receiving satellite signals that may include one or more low noise blocks associated therewith. The antenna 252 may be a single antenna used for satellite television reception. Of course, multiple antennas for receiving signals from satellites in different orbital slots may be used. In a terrestrial system such as a cable television system, no antenna may be used. Rather, a connector to a fiber optic or coaxial cable may be used. Terrestrial systems may have an antenna suitable for receiving terrestrial wireless signals. The user receiving device 250 is connected to a display (e.g., one of the displays 46). The user receiving device 250 may have an output driver 310 for formatting video and audio signals for output to the display 46.

A user receiving device control module 330 may be used to coordinate and control the various functions of the user receiving device 250. The user receiving device control module 330 may include and/or be implemented as a controller. These functions may include functions of: tuners 320A-320N (collectively 320); demodulators 322A-322N (collectively 322); decoders 324A-324N (collectively 324) such as forward error correction decoders; and any corresponding buffers and/or other related functions.

The tuners 320 receive respective signals or data from corresponding individual channels. The tuners 320 may receive data from a satellite or a source such as cable or over-the-air TV broadcasts. The tuners 320 may receive television programming content, program guide data or other types of data. The demodulators 322 demodulate the signals or data to form a demodulated signal or data. The decoders 324 decode the demodulated signals to form decoded data or decoded signals. By providing a number of tuners, demodulators and decoders, a number of different content programs may be used by the user receiving device 250. For example, live viewing and recording may be performed simultaneously. A number of recordings may be made simultaneously depending on the number of tuners available.

The user receiving device control module 330 is in communication with a memory 340. The memory 340 is illustrated as a single box. The memory 340 may be implemented as multiple different types of memories including a hard drive, a flash drive and various other types of memory devices. The memory 340 may be other types of memory or sections of different types of memory. The memory 340 may be non-volatile memory or volatile memory. The memory 340 may include a customer database 341 and a DVR 342. The DVR 342 may include recorded content stored for later playback.

The memory 340 may include storage for various operational data collected during operation of the user receiving device 250. For example, the memory 340 may store user configuration data for each user associated with a device or system. The user configuration data may include rating limits set by a user of the user receiving device 250. A default user configuration may also be established in case visual recognition is not achieved. This will be described in detail below. Other types of data in the memory 340 may include the channel subscription data, the blocked channels, adult channels, current set top box language, TV resolution data, to do list data, the conditional access module identifier, time zone data, time of day daylight savings, status data, aspect ratio data, viewing hours data, quick tune list and a zip code.

The memory 340 may also store the advanced program guide data. The memory 340 may store program guide data that is received from the head end. The program guide data may include amounts of data including two or more weeks of program guide data. The program guide data may be communicated to the user receiving device 250 in various manners including through the satellite 22 of FIG. 1. The program guide data may include content or program identifiers, ratings and various data objects corresponding thereto.

The user receiving device 250 may also include a user interface (UI) 350. The UI 350 may include various types of user interfaces such as a keyboard, push buttons, a touch screen, and a voice activated interface or the like. The UI 350 may be used to: select a channel; change user profiles including acceptable ratings; select various information such as content selections; change the volume; change the display appearance; and/or perform other functions. The UI 350 may also be used for selecting playback locations of the content.

A network interface 352 may be included within the user receiving device 250 to communicate various data through the networks 36, 42 described above. In one implementation, the user receiving device 250 does not include the network interface 352. The network interface 352 may be a WiFi, WiMax, WiMax mobile, wireless, cellular, or other types of communication systems. The network interface 352 may use various protocols for communication therethrough including, but not limited to, hypertext transfer protocol (HTTP).

The user receiving device 250 may also include a conditional access module 360. The conditional access module 360 prevents unauthorized reception of the television signals through the antenna 252. The conditional access module 360 may use a cryptographic hash to authorize the use and display of the received signals. The conditional access module 360 may receive the proper codes or signals from the head end.

The user receiving device control module 330 may also be connected to a Bluetooth module 362 (is Bluetooth® enabled). The Bluetooth module 362 may include and/or be implemented as a Bluetooth transceiver. The Bluetooth transceiver may be in communication with mobile devices (e.g., the mobile devices 31 of FIG. 1). The user receiving device control module 330 may communicate with the mobile devices 31 via the router 44 and/or the Bluetooth transceiver. The transceivers disclosed herein may include and/or be implemented as transceivers.

The user receiving device control module 330 may also include an infrared or radio frequency transceiver 364 for communication with a remote control device 366. The remote control device 366 may be used to, for example, change a channel of the user receiving device 250. The remote control device 366 may also be used to, for example, resume viewing of a channel and/or a video, as is further described below. The remote control device 366 may include a keypad 368 for generating key signals that are communicated to the user receiving device 250. The remote control device 366 may also include a microphone 370 for receiving an audible signal and converting the audible signal to an electrical signal. The electrical signal may be communicated to the user receiving device 250. The remote control device 366 may also include a display 372.

Figure 4:
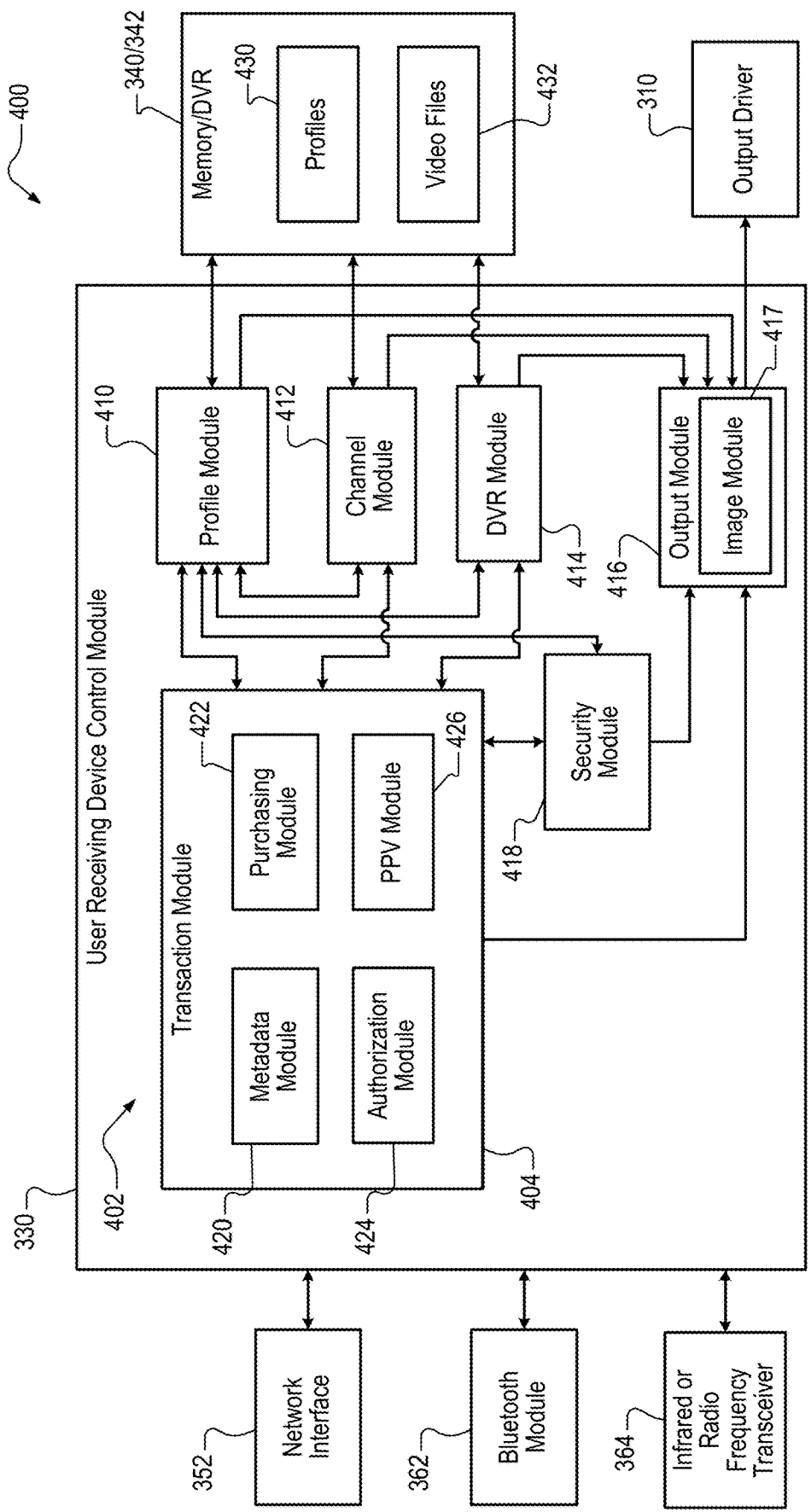
FIG. 4 is a functional block diagram of a control module of the user receiving device of FIG. 3.

FIG. 4 shows a portion 400 of a user receiving device (e.g., one of the user receiving devices 30, 250 disclosed above). The portion 400 includes the output driver 310, the user receiving device control module 330, the network interface 352, the Bluetooth module 362, and the transceiver 364. The portion 400 also includes the memory 340 and the DVR 342, which are shown collectively as memory/DVR 340/342. The user receiving device control module 330 includes a transaction system 402. The transaction system 402 includes a transaction module 404, a profile module 410, a channel module 412, a DVR module 414, an output module 416 and a security module 418.

The transaction module 404 includes a metadata module 420, a purchasing module 422, an authorization module 424, and a pay-per-view (PPV) module 426. The metadata module 420 monitors metadata to detect purchasable objects in a video. The purchasing module 422 may control purchasing of content by a user of a mobile device. This may include receiving and/or exchanging identification information, billing information, and/or contact information with a mobile device of a user and/or a content provider. The stated information may be received from the mobile device and transferred to the content provider or may be provided by the content provider. The stated information may be stored in the memory 340 and accessed by any of the modules 420, 422, 424, 426. The purchasing module 422 may provide confirmation request messages, which may be displayed to confirm that the user wants to purchase certain selected content. The confirmation request messages may have originated at and/or have been received from the content provider.

The authorization module 424 may perform one or more handshake processes with the head end, the content provider, and/or a mobile device to authorize (or reauthorize) reception and/or display of content on a display of the corresponding user receiving device and/or the mobile device. The content may be PPV content or other content. In one embodiment, the authorization module 424 receives authorization signals from a content provider to permit downloading and/or displaying of certain content.

The authorization module 424 may generate authorization preview screens and/or authorization messages. The authorization module 424 may display via the output module 416 the authorization preview screens and the authorization messages. The authorization preview screen may be a blank (or black) screen or may provide, for example, an image of a scene of the content attempting to be accessed by a user. The authorization preview screen may include an authorization message and/or a code.

The pay-per-view (PPV) module 426 may generate PPV preview screens and/or PPV messages. The PPV module 426 may display via the output module 416 the PPV preview screens and the PPV messages. The PPV preview screen may be a blank (or black) screen or may provide, for example, an image of a scene of the content attempting to be accessed by a user. The PPV preview screen may include a PPV message.

The profile module 410 manages profiles 430 of each of the mobile devices paired with the corresponding user receiving device. The profiles 430 may be stored in the memory 340 and accessed by the profile module 410. Each of the profiles 430 may have a unique identifier (ID) number, an assigned security level, and corresponding authorized channels, programs and/or videos. The security level may indicate which channels, programs, and/or videos are permitted to be displayed for the corresponding profile. Different profiles may have the same security level or different security levels. One or more mobile devices may be assigned to a profile and thus have a corresponding profile ID number. Each of the profiles may also include mobile device and/or profile specific features such as volume levels, maximum volumes, amount of time permitted ON over a predetermined period, a playlist of recorded videos, a preferred channel list, and other features. The profile module 410 may create each of the profiles 430 based on: parental control inputs; operation history of the corresponding mobile devices; time of day of watching a channel, program and/or video; and/or profile information provided by the corresponding mobile devices.

The channel module 412 may control selection and output of channels to the output driver 310 via the output module 416. The DVR module 414 may control selection, recording, and/or output of videos. The DVR module 414 may store videos in the DVR 342 and output the videos via the output module 416 to the output driver 310 for display. The channel module 412 and the DVR module 414 may operate based on parental guidance controls. The channel module 412 and the DVR module 414 may provide channels and/or videos to the output module based on the profile ID number and/or the security level associated with a profile of one or more mobile devices. The videos may be stored as video files 432 in the memory 340 and/or DVR 342.

The output module 416 controls output of channels, programs, and/or videos to the output driver 310. This may be based on parental guidance controls. The output module 416 may output channels and/or videos to the output driver 310 based on the profile ID number and/or the security level associated with a profile of one or more mobile devices. The output module 416 includes an image module 417 that may alter a portion of an image of an object to alert a viewer of the object.

The security module 418 may control operation of the output module 416 based on a security level of a profile. The security module 418 may also be used to set passcodes and/or require a passcode to view certain channels, programs and/or videos. The security module 418 may be in communication with the mobile devices via the Bluetooth module 362.

FIG. 5 shows a mobile device 450. Any of the mobile devices of FIG. 1 may be configured as the mobile device 450. The mobile device 450 includes a mobile device control module 452 that controls various functions of the mobile device 450. The mobile device control module 452 includes a second transaction system 453 that includes a transaction module 454, a channel module 458, a video module 459, a profile module 460, an output module 462 and a security module 464. The transaction module 454 includes a metadata module 466, a second purchasing module 468, a second authorization module 470, and a second pay-per-view (PPV) module 471. The metadata module 466 monitors metadata to detect purchasable objects in a video.

The purchasing module 468 may control purchasing of content by a user of a mobile device. This may include receiving and/or exchanging identification information, billing information, and/or contact information with a user receiving device and/or a content provider. The stated information may be stored in the memory 340 and accessed by any of the modules 466, 468, 470 and 471. The purchasing module 468 may provide confirmation request messages, which may be displayed on the mobile device to confirm that the user wants to purchase certain selected content. The confirmation messages may have originated at and/or have been received from the user receiving device and/or the content provider.

The authorization module 470 may perform a handshake process with the head end and/or the content provider disclosed above to authorize (or reauthorize) reception and/or display of content on a display of a user receiving device and/or the mobile device. An authorization signal for selected content may be received from a head end or content provider and forwarded from the mobile device to the user receiving device. The authorization signal permits downloading and/or displaying of certain content.

The PPV module 471 may control PPV purchase requests. The PPV module 471 may generate request signals for PPV content. The PPV request signals may include channel, program and/or video identification information. This information may be provided to a head end, content service provider and/or user receiving device. The PPV module 471 may receive PPV content from the head end, the content provider and/or the user receiving device and forward the content to the channel module, the video module, and/or the memory 482. The PPV module 471 may display the content via the output module 462 on the display 472.

The profile module 460 manages profiles of the mobile device 450 and/or other mobile devices. The profiles 480 may be stored in memory 482 and accessed by the profile module 460. The profiles 480 may have respectively a unique ID, an assigned security level, and corresponding authorized channels, programs and/or videos. The profile ID may be assigned by a user receiving device. The security level may be assigned by another mobile device (e.g., parental device) and/or a user receiving device. The security level may indicate which channels, programs, and/or videos are permitted to be displayed for the corresponding profile. Each of the profiles may also include mobile device and/or profile specific features such as volume levels, maximum volumes, time permitted ON over a predetermined period, a playlist of recorded videos, a preferred channel list, and other features. The profile module 460 may create the profiles 480 based on parental control inputs, operation history of the corresponding mobile devices, and/or profile information provided by the corresponding mobile devices. As an alternative the profile module 460 may receive one or more of the profiles 480 from a user receiving device. The profile module 460 may store user profile data within the mobile device 450. The profile module 460 may store user settings, such as favorites and parental controls. The profile module 460 may also receive profile data from the head end 12.

The output module 462 controls output of signals, guides, channels, programs, and/or videos to the display 472. Although not shown, the mobile device control module 452 may include guide, channel, program, and/or video modules for the accessing and/or displaying respectively of guides, channels, programs, and/or videos. The output module 462 may output signals, guides, channels, programs, and/or videos to the display 472 based on the profile ID and/or the security level associated with the profile 480. The output module 462 includes an image module 463 that may alter a portion of an image of an object to alert a viewer of the object.

The security module 464 may control operation of the output module 462 based on a security level of the profile 480. The security module 464 may also be used to set passcodes and/or require a passcode to view certain channels, programs and/or videos. The security module 464 may be in communication with user receiving devices via a Bluetooth module 484 and/or other interface and/or transceiver.

In one implementation the mobile device 450 may be used as a remote control device and send signals to a user receiving device to select a channel, program and/or video. In another embodiment, the security module 464 provides a passcode, which may be entered by a user of the mobile device 450. Content received by the mobile device control module 452 may be stored in the memory. This may include programs and/or videos 486.

The mobile device control module 452 is in communication with a microphone 488 that receives audible signals and converts the audible signals into electrical signals. The audible signals may include a request signal. The request signal may be to perform a search and/or to obtain guide data, network data and/or playlist data. The mobile device control module 452 is also in communication with a user interface 490. The user interface 490 may include buttons, input switches and/or a touch screen.

The mobile device control module 452 is also in communication with a network interface 492. The network interface 492 may be used to interface with the network 42 of FIG. 1. As mentioned above, the network 42 may be a wireless network or the Internet. The network interface 492 may communicate with a cellular system or with the internet or both. A network identifier may be attached to or associated with each communication from the mobile device 450.

Various examples are disclosed below with respect to the embodiments of FIGS. 6-9 and other embodiments of the present disclosure. Although one or more of the embodiments are primarily described with respect to a content provider, all of the tasks performed by the content provider may be performed by a head end, a content service provider, a network, and/or an intermediary device in communication with a corresponding mobile device, head end, and/or the content provider.

For the embodiments of FIGS. 6-21 and other embodiments disclosed herein, the mobile devices may include software applications (referred to as "apps") with corresponding screens (or windows). The apps may be controlled via one or more modules (e.g., control modules) of the mobile devices and may allow a user to send various types of information disclosed herein to a user receiving device and/or a content provider. The apps and corresponding screens may allow the user to perform various tasks such as confirming a purchase, send billing information, send contact information, answer questions in a survey, selected a product, etc. As used herein, the term "user" may refer to an individual associated with an account provided by a content provider or other user.

Figure 6:
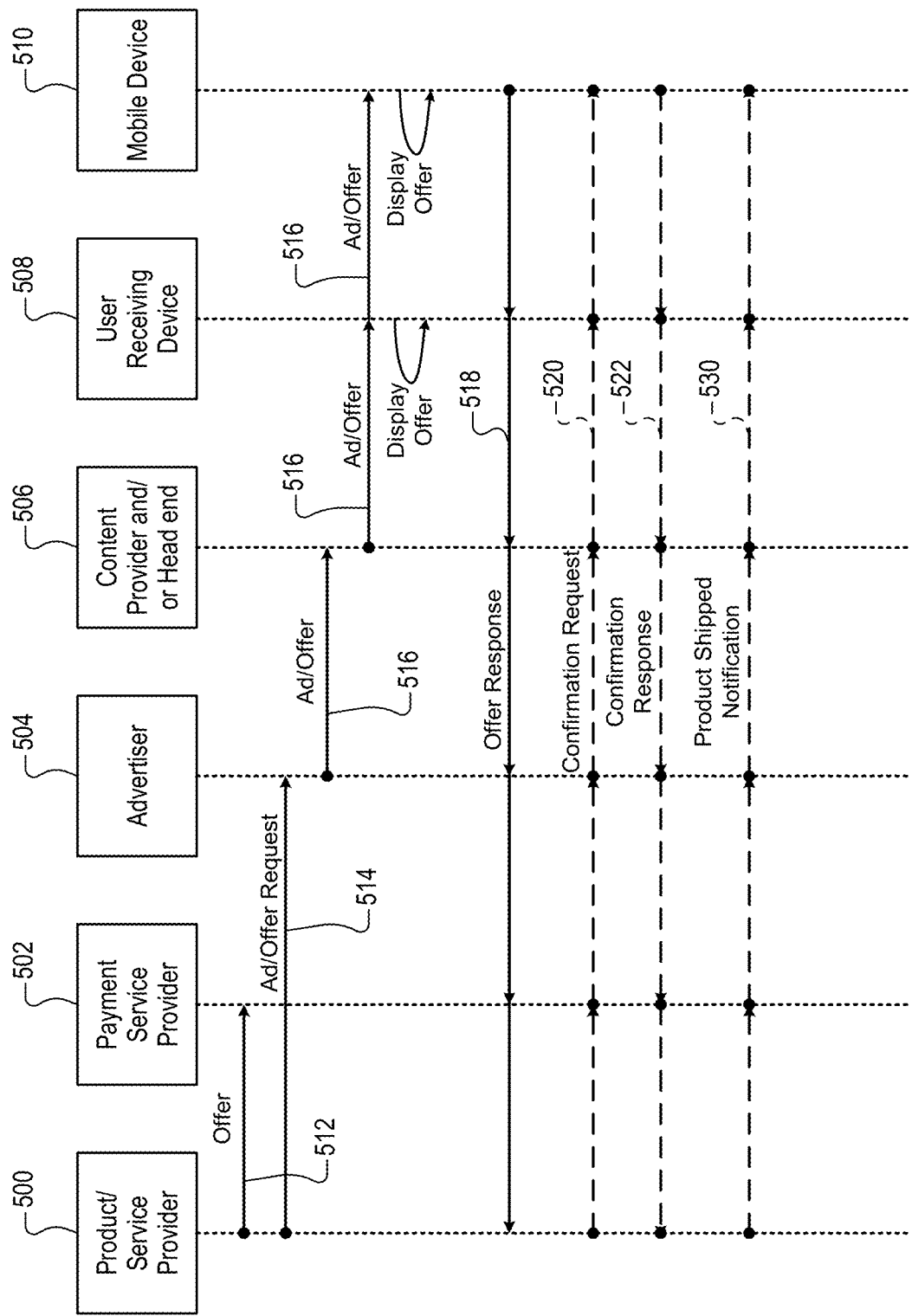
FIG. 6 is a sequence diagram illustrating an advertising and purchasing method in accordance with the present disclosure.
Figure 7:
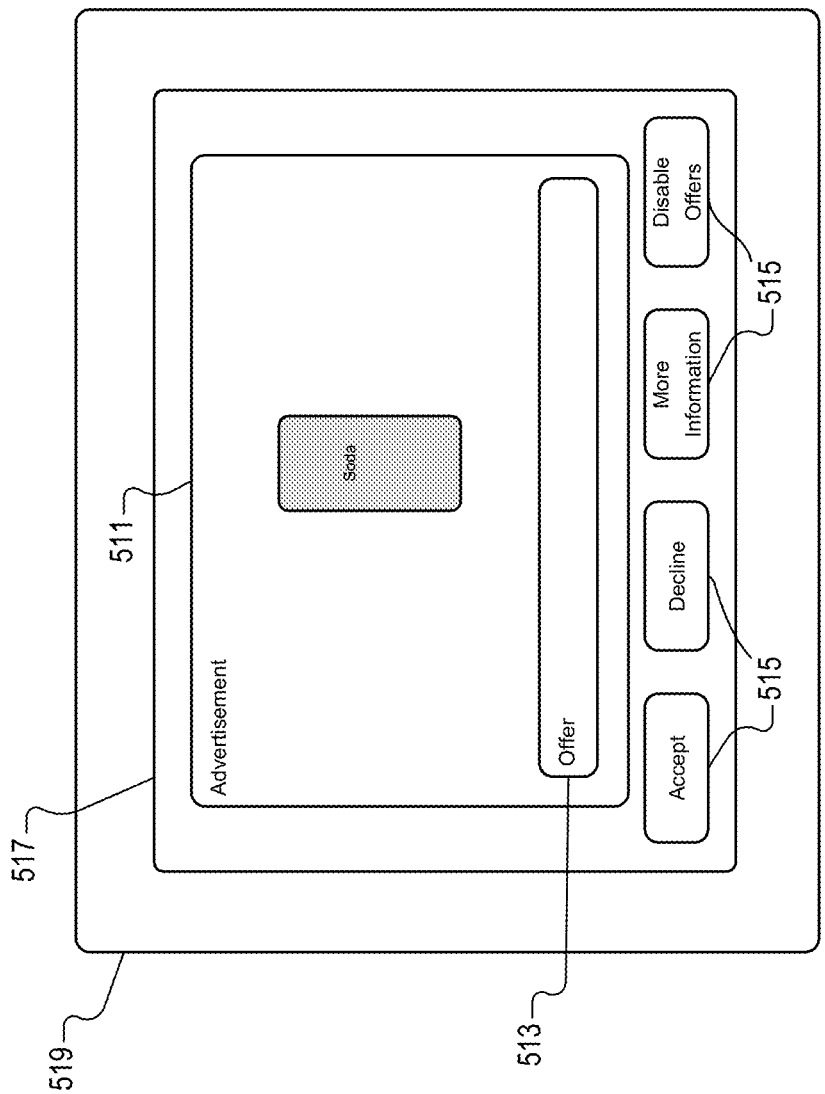
FIG. 7 is a screen illustrating an advertisement, an offer and interaction buttons in accordance with the present disclosure.

FIG. 6 shows a sequence diagram illustrating an advertising and purchasing method. A product and/or service may be offered by a product and/or service provider 500 (e.g., the product and/or service provider 54 of FIG. 1). In the example shown, this is represented by offer signals that may be initiated at, originated by, and/or transmitted from the product and/or service provider 500 to a payment service provider 502 (e.g., the payment service provider 56 of FIG.

1), an advertiser 504 (e.g., the advertiser 58 of FIG. 1), a content provider 506 (e.g., the content provider 14 and/or the head end 12 of FIG. 1), a user receiving device 508 (e.g., one of the user receiving devices 30 of FIG. 1) and/or a mobile device 510 (e.g., one of the mobile devices 31 of FIG. 1).

A first offer signal 512 indicates the offer being presented to the user receiving device 508 and/or the mobile device 510 and is transmitted to the payment service provider 502. The payment service provider 502 is then able to interact with the user receiving device 508 and/or mobile device 510 to perform a transaction. A second offer signal 514, in the form of an ad and/or offer request, may be transmitted from the product and/or service provider 500 to the advertiser 504. The ad and/or offer request may include an offer for a product and/or service and may be a request to the advertiser 504 to generate an advertisement (referred to as an "ad") including the offer. The ad may be generated by the advertiser 504. The ad and/or offer (designated 516) may be transmitted from the advertiser 504 to the content provider 506, which may then be forwarded to the user receiving device 508 and/or mobile device 510.

The ad and/or offer may then be displayed on a display of the user receiving device 508 and/or the mobile device 510. An example, an ad 511, an offer 513 and interaction buttons 515 are shown in a window 517 on a screen 519 in FIG. 7. The interaction buttons may include an "Accept" button, a "Decline" button, a "More Information" button, a "Disable Offers" button, etc. The offer 513 may be superimposed on and/or included in the ad 511. The interaction buttons 515 may be superimposed on or shown separate from the ad 511 and/or offer 513. The ad 511 and/or offer 513 may be displayed prior to, during and/or subsequent to a program and/or video being displayed on the user receiving device 508 and/or mobile device 510. The ad 511 and/or offer 513 may be superimposed on the program and/or video being displayed.

The user may respond to the offer 513 via the mobile device 510 by providing a user input to accept and/or request additional information regarding the offer. The mobile device 510 may generate an offer response 518, which may be transmitted to the user receiving device 508, content provider 506, advertiser, 504, payment service provider 502, and/or product and/or service provider 500. The offer response 518 may be originated at the mobile device 510 and may be forwarded to the user receiving device 508, content provider 506, advertiser, 504, payment service provider 502, and/or product and/or service provider 500.

A confirmation request 520 may be generated by any one of the product and/or service provider 500, the payment service provider 502, the advertiser 504, the content provider 506, the user receiving device 508 and may be sent to any one of the payment service provider 502, the advertiser 504, the content provider 506, the user receiving device 508, and the mobile device 510. A confirmation response 522 may then be generated by any one of the payment service provider 502, the advertiser 504, the content provider 506, the user receiving device 508, and the mobile device 510 and may be sent to any one of the product and/or service provider 500, the payment service provider 502, the advertiser 504, the content provider 506, the user receiving device 508. The confirmation request 520 and the confirmation response 522 may be sent directly between the providers and devices 500, 502, 504, 506, 508, 510 or may be indirectly sent by intermediary ones of the providers and/or devices forwarding the confirmation request 520 and/or confirmation response 522. Other below described confirmation requests and/or confirmation responses may be similarly generated, transmitted and/or forwarded between corresponding providers and/or devices. In one embodiment, a confirmation request includes data that is tracked and sent back to a provider and/or device from which an offer response was generated and/or forwarded from. A confirmation response may include the same data and/or additional data as the confirmation request. The data included in the confirmation response may also be tracked and sent back to a provider and/or device from which a confirmation request was generated and/or forwarded from.

When a user is watching a program and/or video displayed via the user receiving device 508, the user receiving device 508 may display an ad (commercial, infomercial, donor request, etc.). The user may then respond to the offer via the mobile device 510. This may including sending response signals to the advertiser 504, the payment service provider 502 and/or the product and/or service provider 500 and/or transferring related information between (i) the mobile device 510 and (ii) the advertiser 504, the payment service provider 502 and/or the product and/or service provider 500. To respond to the offer, the user may, for example: click on a button on the mobile device (e.g., a button allocated to responding to offers); touch a button or area on the display of the user receiving device 508 and/or mobile device 510; and/or perform one or more other actions via the mobile device 510.

The response to the offer initiates and/or finalizes the transaction offered and accepted by the user. The offer may be accepted and finalized by the offer response 518 or a confirmation request 520 may be generated. The response, as disclosed herein may also lead to other information about the product and/or service being offered and/or to other offers. Responding to the offer and/or acceptance of the offer may trigger the advertiser 504, the payment service provider 502 and/or the product and/or service provider 500 to send coupons, donation requests, offers, and/or information to the user. The coupons, donation requests, offers and/or information may be directed to the initial product and/or service offered and/or to other products and/or services. The coupons, donation requests, offers and/or information may be sent to a home of the user. The donations requests may be for a non-profit organization.

Subsequent to the offer response 518 and/or the confirmation response 522 being received, a product shipped notification 530 may be sent from, for example, the product/service provider 500 to the user receiving device 508 and/or the mobile device 510. The product shipped notification 530 may be displayed on the display of the user receiving device and/or on the display of the mobile device 510. The product shipped notification 530 may indicate to the user that the product has been shipped and/or when the user can expect to receive the product. A transaction performed for a product may be considered completed when an offer response, a confirmation response, and/or a purchase product and/or service is received and/or provided. For example, an on-line portion of a purchase transaction may be considered completed when an offer response is received, a confirmation response is received and/or a product shipped notification is received. The entire purchase transaction may be considered completed when a purchased product is received and/or a purchased service is provided.

The method of FIG. 6 allows a user (or viewer) watching an advertisement to accept an offer from an advertiser. The viewer may take action, such as a click on a special remote control button or navigate a menu on-screen (e.g., display of corresponding user receiving device or mobile device) in order to initiate a transaction with the advertiser. The user receiving device notes for what channel and time the transaction is initiated. Once the viewer initiates the transaction, the transaction information may be sent over the Internet to a computer system (or server) of a content service provider (e.g., DirecTV®) via, for example, the Internet. The transaction information may include customer contact information, billing information, payment information, bill of sales information, product and/or service information, etc. The server of the content service provider (such as any of the example servers of the disclosed content providers and content service providers disclosed herein) may control and/or have access to a customer database and/or an advertiser database. The customer database may be stored at the content provider, content service provider, a head end, or other backend device and include customer information. The advertiser database may be stored at the advertiser and include advertiser information including ads and corresponding offers and/or surveys. The advertiser and/or other backend device may coordinate transfer and acceptance of advertising offers and customer requests. In one embodiment, after the transaction between the advertiser and the viewer (or customer) is finalized, the advertiser may communicate with the content service provider, content provider, head end, payment service provider, product and/or service provider, etc. to make arrangements to provide the purchased product and/or service to the customer.

In addition to products and services, a viewer may request coupons for a product and/or service. For example, a viewer who sees a commercial for diapers may request coupons by clicking on a button (e.g., a "take offer" button or an "Accept Offer!" button) on a mobile device. Upon clicking on the button, a timestamp and channel are sent over the Internet to a central database, which records the customer's request with the appropriate offer. The advertiser is then sent a message according to a previous arrangement with the content service provider (e.g., DirecTV®) giving the name and addresses of the customer (or, to protect customer information, the content service provider sends coupons to the customer on behalf of the advertiser and/or product and/or service provider).

Other types of transactions may also be implemented. For example, in the case of an infomercial, the content service provider may collect a percentage of a sale and bill a customer on a next billing cycle while sending information to a product and/or service provider (or infomercial business) that a new purchase has occurred. As another example, a content service provider may partner with a business (e.g., a local pizza shop) for special offers and broadcast advertisements and the offers to be displayed on displays of user receiving devices and/or mobile devices. Customers may then accept the offers via the mobile devices. As another example, during a game, a viewer may place an order via a mobile device and/or user receiving device to order a product (e.g., a pizza). The content service provider may receive a commission for facilitating this sale.

There are several benefits to having a content service provider facilitate viewer-advertiser transactions. Returning to one of the previous examples, a content service provider knowing that a customer is requesting coupons for a particular product allows the content service provider to cater advertising directed to customers. The content service provider is able to provide advertising that a customer may be interested in, as opposed to other advertising, which the customer may ignore, skip, and/or delete. Tracking what people watch is good, but tracking what offers they accept is better. All of this offers a wider opportunity to increase revenues. Advertisements that a customer is interested in and/or corresponding offers that a customer accepts may be stored as a portion of the customer information and may be shared between backend devices. This provides feedback to allow content service providers and/or advertisers to track what ads are working (i.e. which ads are triggering accepted offers and how many times each of the offers is being accepted). The ads that are working may be improved upon and the ads that are not working may be changed or thrown out. This also improves the customer's experience.

The above-described method of FIG. 6 may include a user receiving device receiving audio-visual data via a satellite, a cable network, a fiber-optic network, the Internet and/or other network. The user receiving device displays programs, advertisements and offers. A viewer watching the programs, advertisements and offers may respond to the offers via a mobile device (e.g., a remote control or cellular phone). The viewer may navigate a guide to: select programs for viewing or purchase; accept an offer from an advertiser; and/or select and/or purchase a product and/or service of an advertisement. The advertisement may be in the form of: a full program (e.g., a program viewed over an extended timespan on a specific viewing channel); or may be provided for a short timespan within and/or as part of a program. Backend devices, including a customer database and/or an advertiser database, fulfill viewer accepted offers from advertisers for content offers (e.g., offers for programs and/or videos) and non-content offers (offers directed to other products and/or services).

As a non-content based example, a viewer may watch a video and an advertisement that presents an offer, which is not deliverable through a user receiving device. The offer may allow a viewer to: request more information regarding a product and/or service and/or related products and/or services; request coupons; make a donation; purchase a product; schedule a visit (e.g., a doctor visit); etc. The viewer accepts the offer and/or transmits one or more of the requests via a mobile device to a user receiving device and/or backend device. This may be done by the user clicking on a special button, clicking sequence of buttons, or through specialized navigation on a screen. Once the viewer accepts the offer and/or makes a request, a series of Internet communications occur. These communications include data being transmitted (i) between the user receiving device and/or mobile device, (ii) between the user receiving device and one or more backend devices, and/or (ii) between the mobile device and one or more backend devices. The communications are performed to establish and confirm which viewer is accepting which offer from which advertiser.

Once the Internet communications are completed and the transaction of accepting the offer is completed, the content provider (or content service provider) and/or the user receiving device fulfills the offer. Depending on the offer accepted, the content provider and/or the user receiving device may fulfill the offer differently. For example, in fulfilling the offer, the content provider and/or the user receiving device may share the viewer's request, name and address to an advertiser associated with the offer selected. As another example, the content provider and/or the user receiving device may: accept payment from a viewer on behalf of an advertiser (while taking a commission of the sale); bill the viewer on behalf of the advertiser; inform the advertiser of the offer acceptance; and/or send the advertiser information pertaining to the offer and acceptance for the advertiser to fulfill or handle the accepted offer. As another example, the content service provider may communicate with the advertiser and/or a service provider of a service being provided to schedule an appointment for the service (e.g., schedule an appointment with a doctor). This may include transferring between the content service provider and one or more backend devices, information such as time and date of appointment, type of appointment, name of company and/or person offering the service, location of the appointment, name of company and/or person offering the service, customer information, billing information of customer, customer contact information, an hourly service rate, etc. If the viewer is purchasing a product from an infomercial, other information (e.g., name of company offering the product, customer information, billing information of customer, customer contact information, price of the product, number of each product purchased, IDs of the products purchased, serial numbers or other identification numbers of the products purchased, etc.) may be transferred between (i) the content service provider and/or the user receiving device and (ii) the product provider. Although the information may vary that is transferred between (i) the service provider and/or the user receiving device and (ii) one or more other backend devices, the way in which a viewer accepts different types of offers may be similar and/or not vary much from a viewer's perspective.

In another embodiment, after a user receiving device has received a viewer's acceptance from a mobile device, the user receiving device may start communicating with a content service provider and/or one or more other backend devices to fulfill the order accepted. This may be done via the Internet and using respective communication protocols to establish and confirm the acceptance of the offer with the one or more backend devices. The user receiving device may record offers presented and offers accepted, which may be shared with one or more of the backend devices. As an alternative, the content service provider may communicate with one or more backend devices to fulfill the order accepted. Information may be transferred between the service provider and the one or more backend devices to complete the transaction associated with the accepted offer. The contact service provider may contact the advertiser, a fulfillment house, a product and/or service provider, etc. in fulfilling the order. Regardless of whether the user receiving device and/or the content service provider fulfills the order, the transaction is completed outside of a STB environment experienced by the customer.

The customer and advertiser databases may be accessed by a user receiving device and/or a service provider. Although the databases 65, 341 of FIGS. 1 and 3 are shown as being included in the advertiser 58 and in the memory 340 of the user receiving device 250, the databases may be stored elsewhere and/or shared by other backend devices. The databases 65, 341 may be stored, for example, in the cloud server 68 of FIG. 1. The databases may include advertisement information, offers, customer information, and/or other information disclosed herein.

Figure 8:
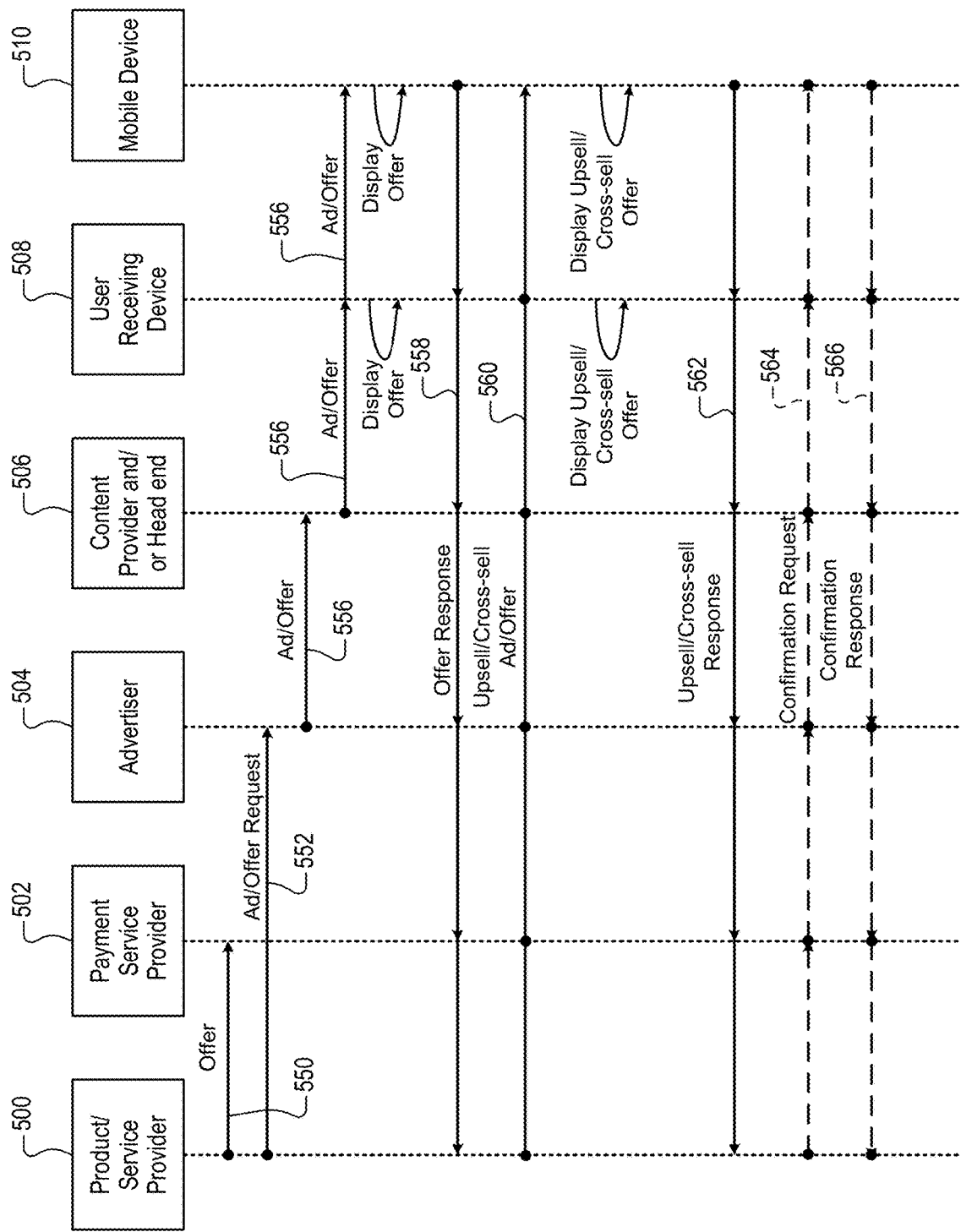
FIG. 8 is a sequence diagram illustrating an upselling/cross-selling method in accordance with the present disclosure.

FIG. 8 shows a sequence diagram illustrating an upselling/cross-selling method. The upselling and cross-selling method is similar to the method of FIG. 6, but further includes upselling and/or cross-selling additional products and/or services. The additional products and/or services may be similar to and/or related to products and/or services that a customer previously was interested in and/or purchased. The additional products and/or services may include upgrades to current products and/or services being purchased and/or may be similar to the current products and/or services being purchased.

The upselling and/or cross-selling may be based on previously tracked customer history including tracking products and/or services that the customer had interest in and/or products and/or services the customer previously purchased. The customer history may be stored in any of the above-disclosed memories and/or servers. The customer history may be analyzed by a user receiving device, a content service provider, a head end, a product and/or service provider, to provide demographic and/or psychographic data. This data may include channels watched by the customer, items purchased, advertisements for which offers are accepted, donations made by the customer (including amounts and to whom or to what the donations are made), period (or time) of day the customer watches television and/or videos, etc.

A first offer signal 550 indicates the offer being presented to the user receiving device 508 and/or the mobile device 510 and is transmitted to the payment service provider 502. The payment service provider 502 may then interact with the user receiving device 508 and/or mobile device 510 to perform a transaction. A second offer signal 552, in the form of an ad and/or offer request, may be transmitted from the product and/or service provider 500 to the advertiser 504. The ad and/or offer request may include an offer for a product and/or service and may be a request to the advertiser 504 to generate an advertisement (referred to as an "ad") including the offer. The ad may be generated by the advertiser 504. The ad and/or offer (designated 556) may be transmitted from the advertiser 504 to the content provider 506, which may then be forwarded to the user receiving device 508 and/or mobile device 510.

The ad and/or offer 556 may then be displayed on a display of the user receiving device 508 and/or the mobile device 510. The ad and/or offer 556 may be displayed prior to, during and/or subsequent to a program and/or video being displayed on the user receiving device 508 and/or mobile device 510. The ad and/or offer 556 may be superimposed on the program and/or video being displayed.

The user may respond to the offer via the mobile device 510 by providing a user input to accept and/or request additional information regarding the offer. The mobile device 510 may generate an offer response 558, which may be transmitted to the user receiving device 508, content provider 506, advertiser, 504, payment service provider 502, and/or product and/or service provider 500. The offer response 558 may be originated at the mobile device 510 and may be forwarded to the user receiving device 508, content provider 506, advertiser, 504, payment service provider 502, and/or product and/or service provider 500.

An upsell ad, a cross-sell ad, an upsell offer, and/or a cross-sell offer (collectively designated 560) may be transmitted from one or more of the back end devices 500, 502, 504, 506 to the user receiving device 508 and/or the mobile device 510. The user receiving device may transmit the upsell ad, a cross-sell ad, an upsell offer, and/or a cross-sell offer 560 to the mobile device. The upsell ad, a cross-sell ad, an upsell offer, and/or a cross-sell offer 560 may be displayed on the display of the user receiving device and/or the display of the mobile device. An upsell and/or cross-sell response signal 562 may be transmitted from the mobile device 510 to one or more of the backend devices 500, 502, 504, 506, 508. The upsell and/or cross-sell response signal 562 may indicate that the customer accepts and/or declines the one or more upsell and/or cross-sell products and/or services.

Although in FIGS. 6 and 8, a certain number of signals are shown additional signals may be communicated between the mobile device 510 and one or more of the backend devices. For example, the viewer may request additional information about one or more products, which may be provided by one or more of the backend devices.

A confirmation request 564 may be generated by any one of the product and/or service provider 500, the payment service provider 502, the advertiser 504, the content provider 506, the user receiving device 508 and may be sent to any one of the payment service provider 502, the advertiser 504, the content provider 506, the user receiving device 508, and the mobile device 510. A confirmation response 566 may then be generated by any one of the payment service provider 502, the advertiser 504, the content provider 506, the user receiving device 508, and the mobile device 510 and may be sent to any one of the product and/or service provider 500, the payment service provider 502, the advertiser 504, the content provider 506, the user receiving device 508. The confirmation request 564 and the confirmation response 566 may be sent directly between the providers and devices 500, 502, 504, 506, 508, 510 or may be indirectly sent by intermediary ones of the providers and/or devices forwarding the confirmation request 564 and/or confirmation response 566. The confirmation request and response 564, 566 may confirm purchasing of one or more products and/or services, which may include one or more upsell and/or cross-sell products and/or services.

Figure 9:
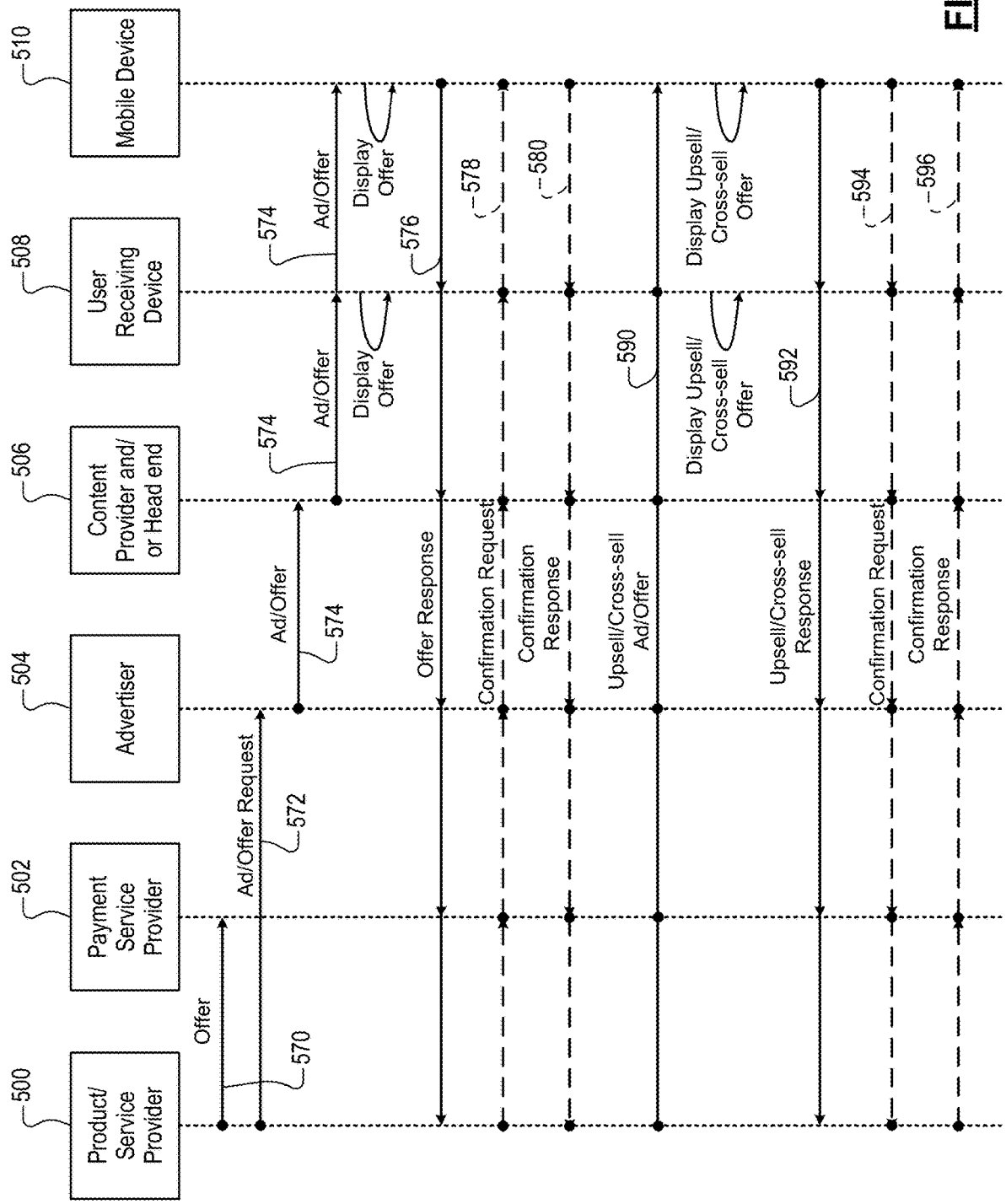
FIG. 9 is a sequence diagram illustrating another upselling/cross-selling method in accordance with the present disclosure.

FIG. 9 shows a sequence diagram illustrating another upselling/cross-selling method. The upselling and cross-selling method is similar to the method of FIG. 8, but includes separate confirmation requests and responses for different offers being accepted.

A first offer signal 570 indicates the offer being presented to the user receiving device 508 and/or the mobile device 510 and is transmitted to the payment service provider 502. The payment service provider 502 may then interact with the user receiving device 508 and/or mobile device 510 to perform a transaction. A second offer signal 572, in the form of an ad and/or offer request, may be transmitted from the product and/or service provider 500 to the advertiser 504. The ad and/or offer request may include an offer for a product and/or service and may be a request to the advertiser 504 to generate an advertisement (referred to as an "ad") including the offer. The ad may be generated by the advertiser 504. The ad and/or offer (designated 574) may be transmitted from the advertiser 504 to the content provider 506, which may then forwarded to the user receiving device 508 and/or mobile device 510.

The ad and/or offer 574 may then be displayed on a display of the user receiving device 508 and/or the mobile device 510. The ad and/or offer 574 may be displayed prior to, during and/or subsequent to a program and/or video being displayed on the user receiving device 508 and/or mobile device 510. The ad and/or offer 574 may be superimposed on the program and/or video being displayed.

The user may respond to the offer via the mobile device 510 by providing a user input to accept and/or request additional information regarding the offer. The mobile device 510 may generate an offer response 576, which may be transmitted to the user receiving device 508, content provider 506, advertiser, 504, payment service provider 502, and/or product and/or service provider 500. The offer response 576 may be originated at the mobile device 510 and may be forwarded to the user receiving device 508, content provider 506, advertiser, 504, payment service provider 502, and/or product and/or service provider 500.

A confirmation request 578 may be generated by any one of the product and/or service provider 500, the payment service provider 502, the advertiser 504, the content provider 506, the user receiving device 508 and may be sent to any one of the payment service provider 502, the advertiser 504, the content provider 506, the user receiving device 508, and the mobile device 510. A confirmation response 580 may then be generated by any one of the payment service provider 502, the advertiser 504, the content provider 506, the user receiving device 508, and the mobile device 510 and may be sent to any one of the product and/or service provider 500, the payment service provider 502, the advertiser 504, the content provider 506, the user receiving device 508. The confirmation request 578 and the confirmation response 580 may be sent directly between the providers and devices 500, 502, 504, 506, 508, 510 or may be indirectly sent by intermediary ones of the providers and/or devices forwarding the confirmation request 578 and/or confirmation response 580. The confirmation request and response 578, 580 may confirm purchasing of one or more products and/or services.

An upsell ad, a cross-sell ad, an upsell offer, and/or a cross-sell offer (collectively designated 590) may be transmitted from one or more of the back end devices 500, 502, 504, 506 to the user receiving device 508 and/or the mobile device 510. The user receiving device 508 may transmit the upsell ad, a cross-sell ad, an upsell offer, and/or a cross-sell offer 590 to the mobile device 510. The upsell ad, a cross-sell ad, an upsell offer, and/or a cross-sell offer 590 may be displayed on the display of the user receiving device 508 and/or the display of the mobile device 510. An upsell and/or cross-sell response signal 592 may be transmitted from the mobile device 510 to one or more of the backend devices 500, 502, 504, 506, 508. The upsell and/or cross-sell response signal 592 may indicate that the customer accepts and/or declines the one or more upsell and/or cross-sell products and/or services.

A confirmation request 594 may be generated by any one of the product and/or service provider 500, the payment service provider 502, the advertiser 504, the content provider 506, the user receiving device 508 and may be sent to any one of the payment service provider 502, the advertiser 504, the content provider 506, the user receiving device 508, and the mobile device 510. A confirmation response 596 may then be generated by any one of the payment service provider 502, the advertiser 504, the content provider 506, the user receiving device 508, and the mobile device 510 and may be sent to any one of the product and/or service provider 500, the payment service provider 502, the advertiser 504, the content provider 506, the user receiving device 508. The confirmation request 594 and the confirmation response 596 may be sent directly between the providers and devices 500, 502, 504, 506, 508, 510 or may be indirectly sent by intermediary ones of the providers and/or devices forwarding the confirmation request 594 and/or confirmation response 596. The confirmation request 596 and response 564, 566 may confirm purchasing of one or more products and/or services, which may include one or more upsell and/or cross-sell products and/or services. Although in FIG. 9, a certain number of transaction signals are shown additional transaction signals may be communicated between the mobile device 510 and one or more of the backend devices.

In the above-described methods of FIGS. 6-9, the mobile device 510 may communicate indirectly with one or more of the backend devices 500, 502, 504, 506, via the user receiving device 508 or may communicate directly with the one or more backend devices 500, 502, 504, 506 to obtain information regarding products and/or services, accept offers, and/or to complete transactions. The same or separate windows and/or display screens may be presented to a customer via the user receiving device and/or the mobile device to accept and/or confirm offers.

Marketing is effective when there are up-sells (or selling to the same customer more of the same product or service, selling additional features for the same product or service, upgrading the same product or service, and/or selling additional products and/or services) and cross-sells (or selling a product or service similar to a product or service purchased by the customer). The above-disclosed embodiments provide targeted ads (or ads which cater to targeted audiences based on customer demographic, psychographic, and viewing data). The above-disclosed embodiments present up-sell or cross-sell ads and corresponding offers in a particular (or predetermined) sequence after a viewer initiates an initial transaction and/or inquires about a product or service.

As an example, a viewer that sees an advertisement on a display of a user receiving device and/or mobile device for pizza due to a targeted ad may "click" and accept an offer for the pizza via the user receiving device and/or mobile device. An order for the pizza may be sent via the internet or other network to a content service provider (e.g., DirecTV®). The content service provider may then verify and fulfill the order by contacting the provider, vendor, and/or business offering the pizza (or other product and/or service). In addition to offering the pizza, a targeted ad may be provided for other related products, such as buffalo wings. This may be based on the customer's history indicating that the customer likes buffalo wings. The provider, vendor, and/or business offering the pizza may be the same or different than the provider, vendor and/or business offering the buffalo wings. The customer may decline or accept the upsell or cross-sell offer presented to the customer.

The disclosed embodiments allow a user receiving device to offer upsell and/or cross-sell ads to the customer based on a currently purchased and/or inquired about products and/or services. The upselling and cross-selling provide: a better customer experience; additional profit potential for a content, product and/or service providers (either through increased ad revenues and/or commissions) by building upon a buyer whose already in a purchasing mood; metrics regarding customers purchasing habits (which feeds into targeted ads and provides an indication of what ads work or not); and better relations with advertisers as tracking and metrics may be shared. The metrics allow advertisers to measure customer responses to direct marketing. The commissions may be provided from, for example, an advertiser and/or a product and/or service provider to a content service provider sending the corresponding ads and offers to customers. This provides increased revenue for the content service provider.

As an example, a user with a remote control (or mobile device) sees an ad and an offer being displayed on a display. If the user decides to accept the offer, the user may click on the mobile device to signal a user receiving device to begin a transaction. The user receiving device interacts with a server, which links the user to an advertiser. The user receiving device and/or the server fulfills an order or schedules fulfillment of the order by sending transaction information, receiving user confirmations, and displaying confirmation messages to the user.

Targeted ads refer to ads preselected to match data for a particular user based on demographic, psychographic, and/or viewing habits of the user and whatever 'selects' (to use the direct response marketing term) characterize the user. Transactions may be interrupted prior to being confirmed to present a user with additional offers. The user sees a targeted ad, is presented an offer, and clicks to accept the offer. However, instead of immediately handling and confirming the transactions, the user is shown another targeted ad with an upsell offer or a cross-sell offer. If the upsell offer or cross-sell offer is accepted, then the initial transaction may be accepted or dropped. If dropped, the upsell or cross-sell is processed and confirmed by the user. If the initial offer is accepted, then the initial offer and the upsell or cross-sell offer is processed and confirmed by the user. As an alternative, after an initial offer and corresponding transaction is confirmed, an additional offer may be presented to the user. The user sees a targeted ad, is presented an offer, and clicks to accept the offer and the transaction is handled as expected. However, after the confirmation of the initially accepted offer is confirmed, the user is shown another targeted ad with an upsell offer or a cross-sell offer. If the upsell or cross-sell offer is accepted, then another transaction corresponding to the upsell or cross-sell offer is processed and confirmed by the user. Other sequences of ads, offers, transactions, and confirmations of the transactions may be performed.

Figure 10:
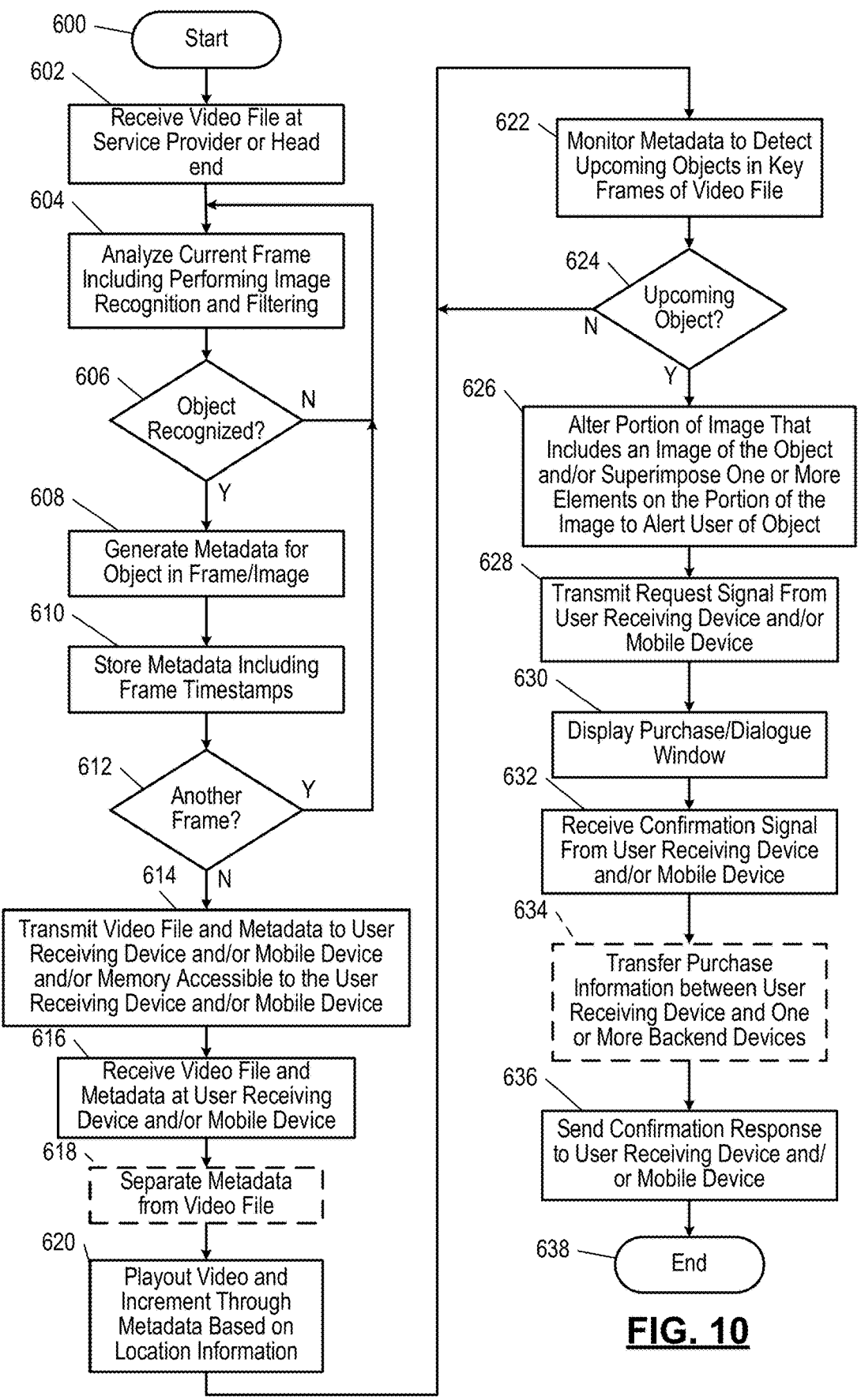
FIG. 10 is a product alerting method in accordance with the present disclosure.

The systems disclosed herein may be operated using numerous methods, an example method is illustrated in FIG. 10. Although the following tasks of FIG. 10 are primarily described with respect to the implementations of FIGS. 1-9, the tasks may be easily modified to apply to other implementations of the present disclosure. The tasks may be iteratively performed and may be implemented via software and/or hardware corresponding to the disclosed modules. In FIG. 10, a product alerting method is shown. Although the tasks of FIG. 10 are described with respect to certain modules, servers and/or devices, the tasks of FIG. 10 may be performed by control modules and/or other modules of a mobile device, a user receiving device, a content provider, a head end, a content service provider, an advertiser, a product and/or service provider, and/or other device. The mobile device, user receiving device and content provider described below with respect to the tasks of FIG. 10 may refer to any mobile device, user receiving device and/or content provider disclosed herein.

The method may begin at 600. At 602, a content service provider (or head end) receives and/or accesses a video file from one or more other backend devices (e.g., advertiser server and/or product and/or service provider server). The video file may be received from an advertiser and/or accessed from a server (e.g., the cloud server 68 of FIG. 1). The video file may be provided to a video processing module (e.g., the video processing module 219 of FIG. 2).

At 604, the video processing module analyzes a current frame of the video file including performing image recognition and filtering to detect objects in the frame. Algorithms may be executed to detect and filter the objects. The algorithms may be performed in order to distill purchasable object metadata from the current frame and/or video stream. The video processing module may include filters and/or may access a filter database and/or an object database to filter each frame of the video file and detect the objects in the frames. The video processing module may compare portions of each frame to objects included in the object database. The filter database and the object database may be stored in memory (e.g., the memories 340, 482 of FIGS. 3 and 5 or in a memory of the cloud server 68 of FIG. 1). Examples of a filter database 343 and an object database 345 are shown in FIG. 3.

At 606, the video processing module determines whether an object has been detected. If an object has been detected in the current frame, task 608 is performed. Task 604 may be performed until a determination is made that no object is in the current frame and/or until a predetermined period of time has lapsed. Although not shown in FIG. 10, if no object is detected in the frame, task 612 may be performed subsequent to task 606.

At 608, the video processing module may generate metadata for the objects detected in the current frame (or image). The metadata may include: a timestamp of a start of the current frame; object identifiers; object edge descriptions; a stop (or end) timestamp of the current frame; locations dimensions, and/or other information describing the detected objects. The object edge descriptions may include data describing edges of detected objects in the current frame and may include coordinate drawing vectors. At 610, the metadata provided at 604 and/or generated at 608 is stored as a metadata file in memory (e.g., memory 216 of FIG. 2).

At 612, the video processing module may determine whether there is another frame in the video stream to process. If there is another frame to process, task 604 is performed, otherwise task 614 is performed. Tasks 604-612 may be repeated for each frame of a video stream.

At 614, the video stream (or video file) and the metadata file are transmitted from the head end (or other back end device) to a user receiving device and/or the mobile device and/or to a memory accessible to the user receiving device and/or the mobile device. The video file and metadata file may be transmitted via a satellite, the Internet and/or other network. The video file and metadata file may be transmitted via a wireless network and/or a wired network. The video file and the metadata file may be transmitted as a single file and/or signal or as separate files and/or signals.

At 616, the video file and metadata file are received at the user receiving device and/or the mobile device. At 618, the user receiving device and/or the mobile device may separate the metadata from the video file depending upon how the metadata and the video file were transmitted.

At 620, the user receiving device or the mobile device plays out the video of the video file on a display while incrementing through (or monitoring) metadata based on location information (e.g., a current frame number) of the video being shown. At 622, a metadata module (e.g., one of the metadata modules 420, 466 of FIGS. 5-6) monitors the metadata to detect upcoming objects in key frames of the video file. This may include identifying key frames with purchasable objects based on object information included in the metadata. The key frames refer to frames that include objects (i.e. products and/or service indicators that are purchasable).

At 624, the metadata module determines whether an upcoming object in a key frame is detected. The detected object may be in a current key frame being displayed or may be in a subsequent key frame that has not yet been displayed. If an upcoming object is detected, task 626 is performed. If no purchasable objects are detected in any of the frames of the video file, the method may end at 638.

At 626, an image module (e.g., one of the image modules 417, 463 of FIGS. 4-5) may alter one or more portions of the frame (or image) being displayed and/or may superimpose a graphical image over the one or more portions of the frame being displayed to alert a viewer of respectively one or more purchasable objects. This may include highlighting, underlining, outlining, changing color, shading, patterning, adjusting a corresponding gray-scale, and/or animating the one or more portions of the frame. The altering may also or alternatively include causing the one or more portions of the image or a portion of the one or more portions to blink. Each of the one or portions of the frame may be altered the same or differently. The animation may include superimposing moving sparkles, arrows, or other items on or near the one or more objects. The altering of the image may include changing a contrast ratio or optically filtering the one or more portions of the image. While the one or more portions of the image are altered, the other portions of the image may remain the same or may also be altered to make the one or more portions more noticeable. For example, a grey scale or contrast ratio of the remaining portions of the image may be altered to dim or partially fade out the remaining portions of the image thereby making the one or more portions of the image more pronounced.

Figure 11:
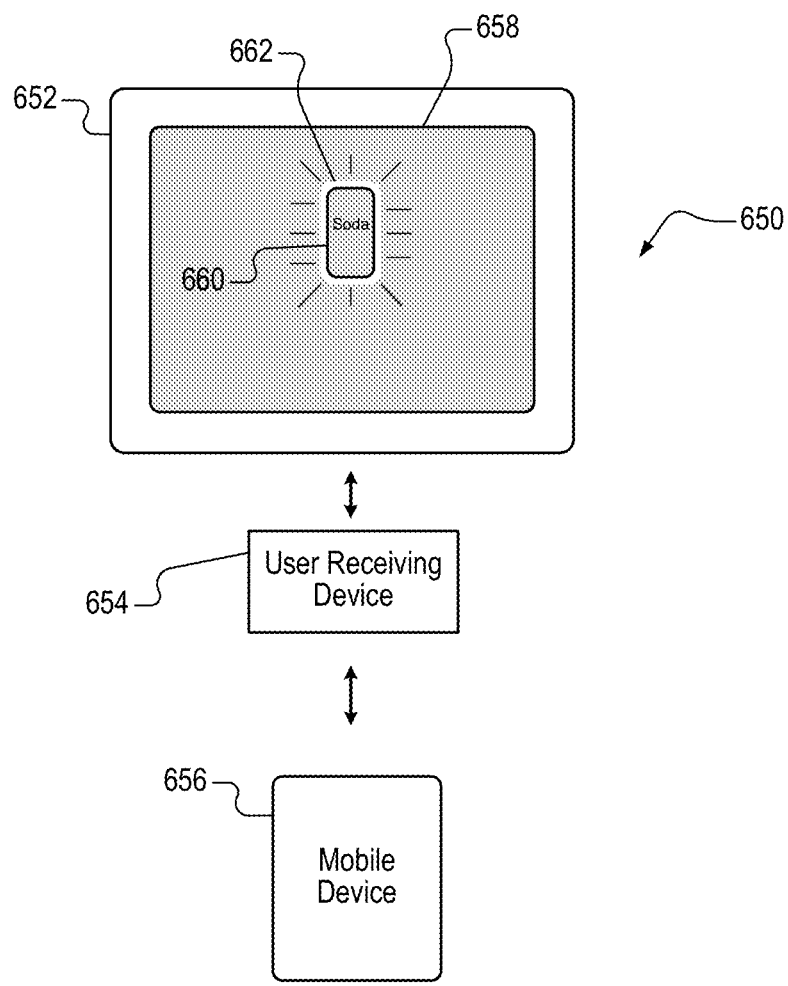
FIG. 11 is a functional block diagram is a product alerting system in accordance with the present disclosure.

As an example, FIG. 11 shows a product alerting system 650 that includes a display 652, a user receiving device 654, and a mobile device 656. The user receiving device 654 may display an image 658 on the display 652. The image 658 may include an object 660 (e.g., a soda drink), which may be highlighted or altered such that the soda drink appears to be glowing, as shown. The image altering may be provided using graphics frameworks software and/or a cross-language, multi-platform application programming interface (API) for rendering 2D and 3D vector graphics (e.g., OpenGL® software). As shown, an illumination ring 662 is provided over edges of the object 660. The illumination ring and/or other altercations may be provided based on previously performed image recognition, object edge detection, and/or generated metadata indicating: which frame the object is located; dimensions and/or sizes of the object; the location of the object in the frame; and/or other object related information. The image module may superimpose the illumination ring 662 by using the edge detection metadata as a reference to trace an outer edge of the object. The superimposing of graphical items over an image allows a user to see a purchasable object without affecting a program and/or video being watched.

At 628, if the viewer is interested in one of the objects being displayed, the viewer may via the mobile device: highlight and/or click on the object; click a button on the mobile device; tap on or perform a swipe action on the image being displayed on the mobile device; tap on or perform a swipe action on the portion of the image that includes the object; click on an item in a menu being displayed on the user receiving device and/or mobile device; and/or perform another action to select the object. The user receiving device and/or the mobile device generates a request signal based on the input generated due to the viewer's selection. The request signal may be: transmitted from the mobile device to the user receiving device; forwarded from the user receiving device to a backend device (a payment provider, an advertiser, a product and/or service provider, a network server, etc.); and/or transmitted from the user receiving device or the mobile device to the backend device.

The objects selected by the viewer may be stored in memory (e.g., one of the memories 340, 482 of FIGS. 3 and 5 or in the cloud server 68 of FIG. 1) and later accessed by the user receiving device and/or the mobile device and viewed by the viewer. For example, in one embodiment, at the end of a program and/or video being watched, the user is presented by the mobile device and/or the user receiving device with one or more menus and/or dialogue windows (e.g., the dialogue windows of FIGS. 12-13). The menus and/or dialogue windows provide additional information regarding the selected objects and/or allow the viewer to purchase the one or more selected objects. The storing of the selected objects may include storing object identifiers, advertiser information, program and/or video information identifying the program and/or video being watched, and/or other information pertaining to the program and/or video may be stored. This may also include storing the frame number of the program and/or video. The saving of the objects, allows customers to save items of interest without completely diverting the customers attention away from a program and/or video being watched to a second screen device (e.g., the display of the mobile device). The customers no longer need to look items up on-line that are seen in a program and/or video, but rather can review saved items and/or proceed to purchase the saved items via the mobile device and/or user receiving device, as described herein. The items may be saved from any digital platform providing the disclosed capabilities. A customer may browse the saved items and/or other related information, features and products at the customer's convenience.

The generation and transmitting of the request signal may: trigger a purchase; initiate a transaction for a purchase; initiate transmission of information about the object; trigger display of an offer; and/or trigger a dialogue window (example dialogue windows are shown in FIGS. 12-13) to open. The generation and transmitting of the request signal may trigger upselling and/or cross-selling of additional features and/or other products and/or services.

In one embodiment, a single click and/or swipe on or over the object may trigger a sale. Backend devices may then arrange for the object to be purchased and delivered to the customer. This allows an item to be purchased through minimal interaction with the viewer.

Following task 628, various tasks may be performed to provide the viewer with additional information and/or to carry out and confirm the purchase of one or more products and/or services, as described above with respect to FIGS. 6-9 and as described further below. Various dialogue windows may be opened including the dialogue windows of FIGS. 12-13. The user, in order to start and complete a transaction, the user may interact with the user receiving device and/or the mobile device in a guided sequence of steps using the mobile device and on-screen menus and/or dialogue windows. The guided sequence of steps guide the user through: selecting various products, features, and/or services; providing various information if needed; and completing a purchase.

At 630, the dialogue windows of FIGS. 12-13 and/or other dialogue windows may be opened. FIG. 12 shows a dialogue purchasing window 631, which includes purchasing information, such as price per unit, quantity of units being purchased, product details, product reviews, an image of the product, etc. The dialogue purchasing window may include "back" and/or "continue" buttons. The back button may return the viewer to the video being watched. The continue button may direct the viewer to the dialogue confirmation window 633 of FIG. 13. The dialogue confirmation window 633 may include confirmation information including a price total for the objects being purchased, a total number of objects being purchased, customer information, billing information, payment information, etc. The dialogue confirmation window may include an image of the object(s) being purchase, a "back" button and a "confirm" button. The back button may return the viewer to the dialogue purchasing window and/or the video being watched. The confirm button may confirm and complete the transaction and then return the viewer to the video being watched.

At 632, upon receiving a confirmation from the viewer via the mobile device, a confirmation signal is generated. The confirmation signal may be transmitted from the user receiving device and/or the mobile device to one or more of the backend devices.

At 634, purchase information may be transferred between the user receiving device and one or more of the other backend devices to fulfill the order. This may include transferring the information displayed in the dialogue windows and/or other related information (e.g., secure information not shown in the dialogue windows). Secure information may include, for example, personal information such as a customer name, account numbers, a driver license number, a social security number, date of birth, etc. The backend devices then schedule delivery of the purchase products.

At 636, a confirmation response signal may be generated and transmitted to the user receiving device and/or the mobile device to indicate to the customer that the sale is completed. An email and/or text message may be sent to an email account of the customer and/or to the mobile device to provide a receipt of the sale to the customer. The method may end at 638.

In one embodiment, if the viewer selects too many objects (more than a predetermined number within a predetermined period of time) or the user receiving device and/or mobile device receive too many request signals (more than a predetermined number in a predetermined period) for objects, then one or more of the above-described tasks may not be performed. This indicates that the viewer is not actually selecting the objects and/or that an error has occurred. As an example, one or more of tasks 622-636 may not be performed and/or the object information may not be saved.

In one embodiment, a pop-up window or icon may be displayed at an end of a program and/or video to remind the viewer of the objects saved during playout of the program and/or video. In another embodiment, the viewer is presented with guided questions to determine what products, features (or accessories), and/or services the viewer is interested in and to make sure that the viewer is purchasing the correct items. These questions may be asked prior to the viewer accepting and confirming a purchase. The control modules of the user receiving device and/or mobile device may display the questions on corresponding displays.

Figure 14:
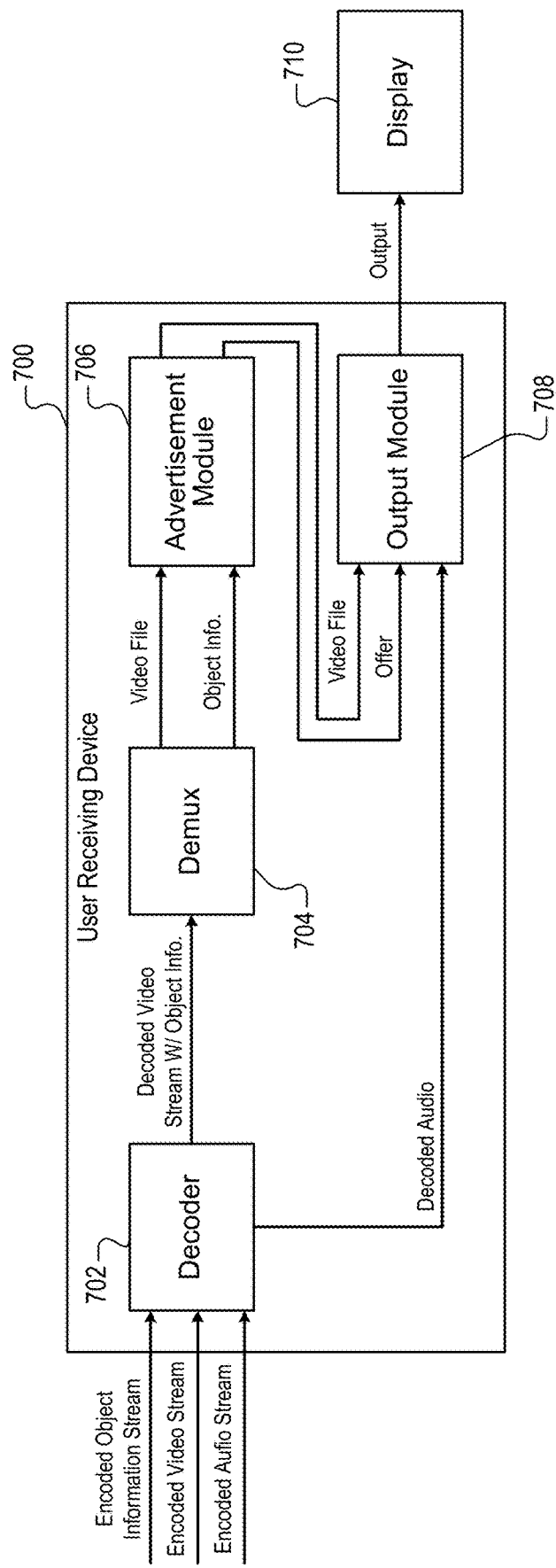
FIG. 14 is a functional block diagram of a user receiving device illustrating a program and advertising output in accordance with the present disclosure.
Figure 17:
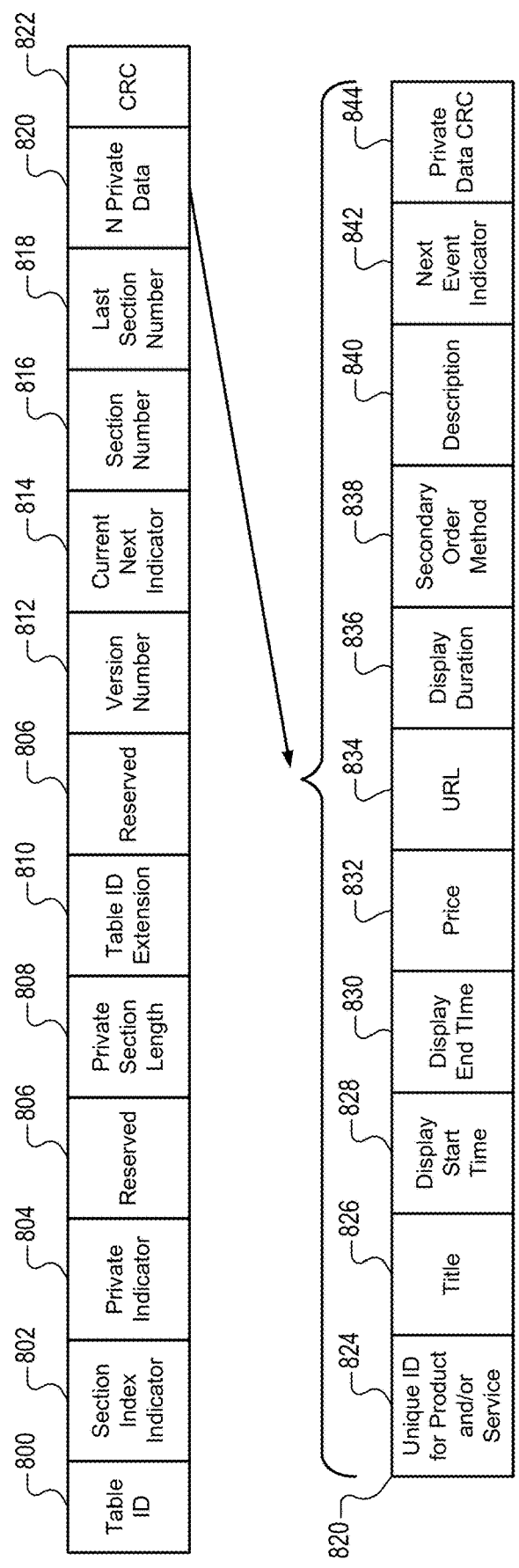
FIG. 17 illustrates a format of a moving pictures expert group (MPEG)-2 transport stream (TS) packet in accordance with the present disclosure.

FIG. 14 shows a user receiving device 700 illustrating a program and advertising output. The user receiving device 700 may replace and/or be implemented as any of the other user receiving devices disclosed herein. The user receiving device 700 may include a decoder 702, a demultiplexer 704, an advertisement module 706 and an output module 708. The decoder 702 decodes an encoded video stream and an encoded audio stream received from a wireless and/or wired network. The encoded video stream may include object (product and/or service) information including ads and/or advertisement information and/or offers for one or more objects in the video stream. The object information may be in a moving pictures expert group (MPEG)-2 transport stream (TS) packet. An example of a format of a MPEG-2 TS packet is shown in FIG. 17. The object information may include prices of products and/or services, descriptions of products and/or services, uniform resource locators (URLs) corresponding to websites of the products and/or services, display times (e.g., frame ID numbers) of the products and/or services, display durations of the products and/or services, and secondary order information.

The decoder 702 outputs a decoded video stream and object information to the demultiplexer 704 and decoded audio data to the output module 708. The demultiplexer 704 separates the object information from the decoded video stream (or decoded video file). The video file may be of a program, an ad, a PPV video, and/or other video. The encoded video stream may be decoded and demultiplexed such that the video and corresponding offers are synchronized such that the offers are displayed at appropriate times relative to frames of the video.

Figure 16:
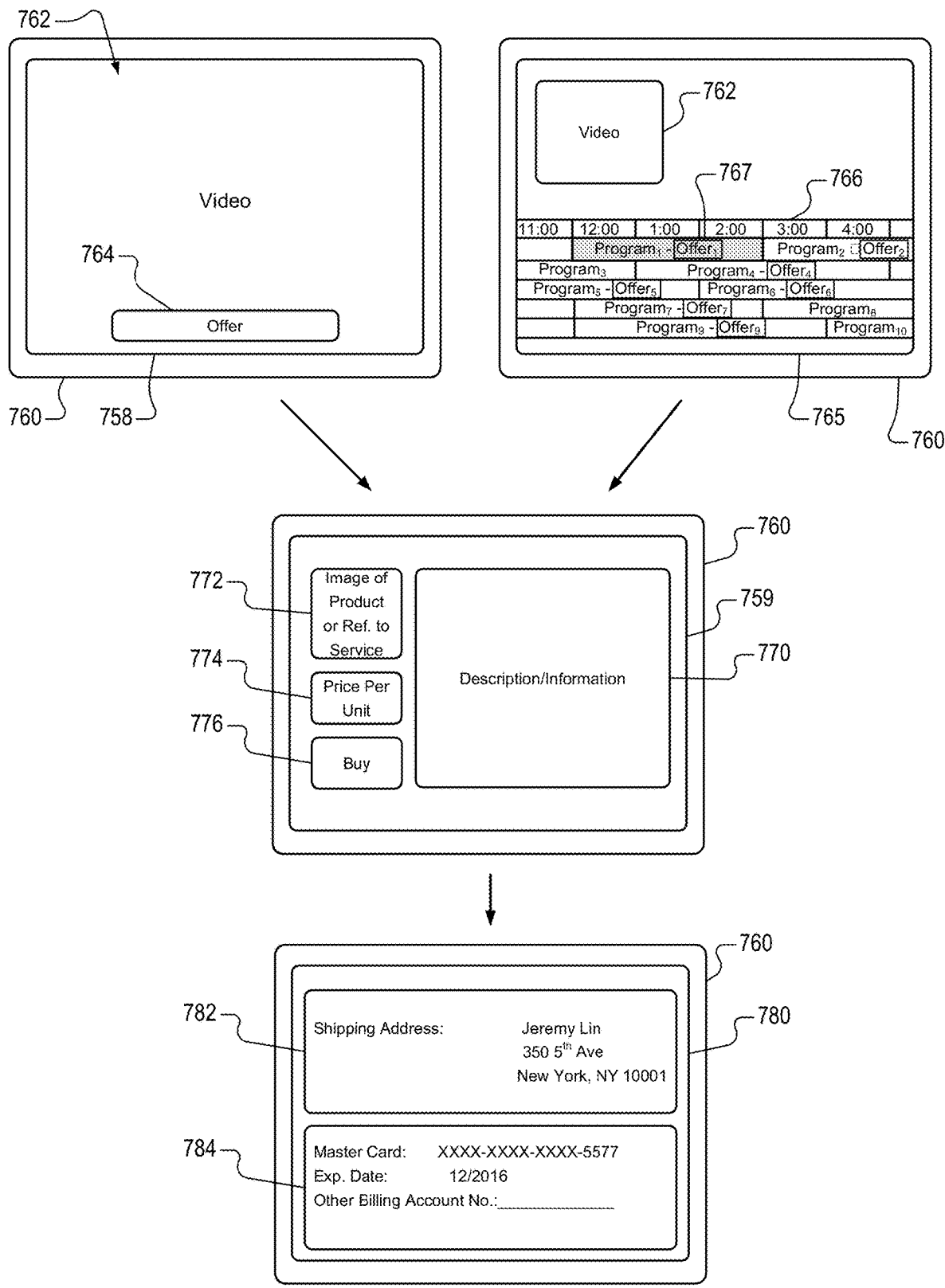
FIG. 16 is an advertising and purchasing diagram illustrating corresponding display screens in accordance with the present disclosure.

The advertisement module 706, based on the object information, may generate one or more offers. The video file and the offers may be provided to the output module 708. The output module 708 may display the video file and the offers over the images of the video being played out on the display 710. The offers may be displayed as, for example, banners over the video being played out. The object information indicates when and for how long the offers should be displayed. This may be based on the timing and duration information of the corresponding products provided in the object information. An example banner is shown in FIG. 16. As an alternative, a portion of the image may be altered as described above. As an example, if the user clicks on or performs a swipe gesture on the image, a window (e.g., one of the dialogue windows disclosed herein or a URL window) may be opened on the display 710 of the user receiving device 700 to allow the viewer to purchase the selected items. URL window may be for a site of the company offering the product and may be similar to a URL window that is displayed on a computer and/or mobile device.

As an example, a movie being displayed on the display 710 may show an actor wearing a bracelet. The image of the bracelet may be altered and/or an offer may be displayed for the bracelet. The viewer clicks on the bracelet, performs a swipe gesture on the mobile device, clicks a button on the mobile device and/or performs another action to indicate to the mobile device that the viewer is interested in the product. An MPEG-2 TS packet of the movie may have a private section of data that includes a URL (or web address) for the bracelet. The user receiving device may open a window for a website associated with the URL to allow the viewer to view the bracelet and/or other products and purchase the bracelet. This may be accomplished via an Internet connection of the user receiving device. In addition to the offer, a description dialogue window (or box) may be superimposed over the movie. The private section of data may (i) indicate to the user receiving device when and how long to display the description dialogue window, and (ii) include a description to include in the description dialogue window. The user may click on the product, the offer window, the description window, and/or a button on the screen to show interest in the product. The movie may then be paused and the viewer may be presented with a URL website for the product and/or company that sells the product.

Types and styles of the dialogue, offer, and description windows disclosed herein may be adjusted via a settings window. The settings associated with the settings window may be stored in the memory of the user receiving device and adjusted by a user. For example, a user may adjust the sizes of the windows and/or where on a display the windows are to be shown. The windows may include thumbnails for selecting and/or viewing products and/or services. In one embodiment, the windows are shown as thumbnails over the movie, video and/or program being watched and are selectable.

Figure 15:
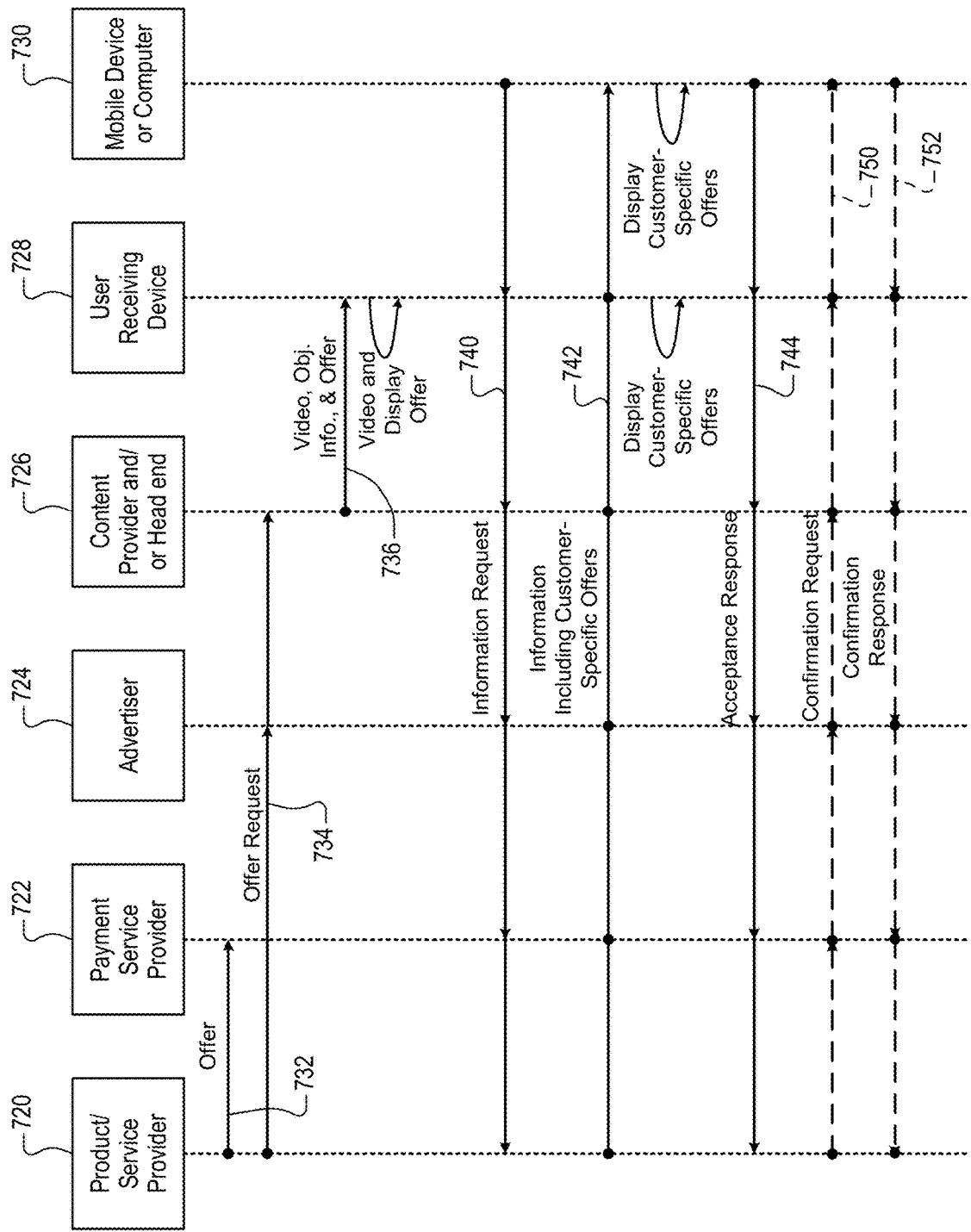
FIG. 15 is a sequence diagram of another advertising and purchasing method in accordance with the present disclosure.

FIG. 15. shows a sequence diagram of another advertising and purchasing method. The tasks performed in the sequence diagram may be performed by a product and/or service provider 720, a payment service provider 722, an advertiser 724, a content provider and/or head end 726, a user receiving device 728 and/or a mobile device 730 (or computer). A product and/or service may be offered by the product and/or service provider 720 (e.g., the product and/or service provider 54 of FIG. 1). In the example shown, this is represented by offer signals that may be initiated at, originated by, and/or transmitted from the product and/or service provider 720 to the payment service provider 722 (e.g., the payment service provider 56 of FIG. 1), the advertiser 724 (e.g., the advertiser 58 of FIG. 1), the content provider 726 (e.g., the content provider 14 and/or the head end 12 of FIG. 1), the user receiving device 728 (e.g., one of the user receiving devices 30 of FIG. 1) and/or a mobile device 730 (e.g., one of the mobile devices 31 of FIG. 1).

A first offer signal 732 indicates the offer being presented to the user receiving device 728 and/or the mobile device 730 and is transmitted to the payment service provider 722. The payment service provider 722 is then able to interact with the user receiving device 728 and/or mobile device 730 to perform a transaction. A second offer signal 734, in the form of an offer request, may be transmitted from the product and/or service provider 720 to the advertiser 724. The offer request may include an offer for a product and/or service and may be a request to the advertiser 724 and/or content provider 726 to generate and/or output a video, a program, an ad, etc. and object information. The video, object information and offer are designated 736 and transmitted from the content provider 726 to the user receiving device 728. The video and offer are displayed on a display connected to the user receiving device.

The object information may include a unique identifier for the object being offered. The video, object information, and/or offer may be broadcast from the content provider to the user receiving device 728. The identifier may be paired with a corresponding ad, video, program, offer, offer banner, etc. and stored in memory of the user receiving device 728.

The user may respond via the mobile device 730 to the offer being presented using various techniques disclosed herein. The mobile device 730 may generate an information request signal 740, which may be transmitted to one or more of the backend devices 720, 722, 724, 726 and/or 728. This triggers purchasing actions and/or a transaction to be initiated. The user may be presented with dialogue windows, which contain detailed information of the products and/or services being offered, discounts based on region of the user e g device, as well as additional customer and vendor specific parameters. The customers will be able to quickly purchase the product of interest by selecting preset and displayed or referenced shipping address and credit card information previously stored in a customer database of a content provider (or broadcaster of the video).

Product and/or service information including customer-specific offers 742 may be transmitted back to the user receiving device 728 and/or the mobile device 730 for display to the viewer via respective displays of the user receiving device 728 and/or the mobile device 730. Interaction buttons as described above or other user input items may be displayed for the viewer to accept one or more of the offers presented.

The mobile device 730 may then generate an acceptance response 742 when the viewer provides an input to the mobile device 730 indicating acceptance of one or more of the offers presented. The acceptance response signal may be transmitted to one or more of the backend devices 720, 722, 724, 726, 728.

A confirmation request 750 may be generated by any one of the product and/or service provider 720, the payment service provider 722, the advertiser 724, the content provider 726, the user receiving device 728 and may be sent to any one of the payment service provider 722, the advertiser 724, the content provider 726, the user receiving device 728, and the mobile device or computer 730. A confirmation response 752 may then be generated by any one of the payment service provider 722, the advertiser 724, the content provider 726, the user receiving device 728, and the mobile device or computer 730 and may be sent to any one of the product and/or service provider 720, the payment service provider 722, the advertiser 724, the content provider 726, the user receiving device 728. The confirmation request 750 and the confirmation response 752 may be sent directly between the providers and devices 720, 722, 724, 726, 728, 730 or may be indirectly sent by intermediary ones of the providers and/or devices forwarding the confirmation request 750 and/or confirmation response 752.

The above-described method allows a viewer to be able to obtain detailed product information quickly via the user receiving device 728 instead of having to go elsewhere to find out more about a product and/or service. The viewer is able to then make quick purchases via the mobile device 730. This approach can be especially effective on impulse buyers. This method also allows a content provider and/or other backend device to have unique knowledge of a customer, which can then be used to offer special product and/or service deals. This may be based on specific parameters such as location of the user receiving device, personal interests of the customer, and/or television viewing preferences. The content provider operates as a sales channel for product and/or service vendors. Extra value is provided to traditional television based ads, such that quick inquiries and purchases of products and services can occur via user receiving devices. Convincing sales pitches may be provided to potential buyers since the products and/or services may be shown in the context of a show, program, and/or video, which can provide an emotional effect on a viewer.

FIG. 16 shows an advertising and purchasing diagram illustrating corresponding display screens. In a first display screen 758 of a display 760 of a user receiving device, a video 762 is shown and an offer 764. A user may click on the offer to inquire about a product and/or service being offered and/or to accept the offer. For the embodiments disclosed herein, the ads, offers, descriptions, transaction buttons, interface items, etc. may be (i) displayed anywhere on a screen, a video, and/or a preview video being played out and/or (ii) integrated in the video and/or the preview video.

In a second display screen 765 of the display 760, a downsized version of the video and a guide 766 are shown. The guide 766 includes times for programs and offer buttons 767 or other offer indicators. The offer buttons may be provided for programs in which offers are available. The offers may be for products and/or services shown in the program and/or may be for the program itself. Programs and/or videos that include purchasable objects may be referred to as spot-enabled programs.

In a third display screen 759 of the display 760, a description information window 770, an image of the product 772, a price per unit 774, and a "buy" button 776 are shown for example purposes only. After a viewer clicks on the offer 764 and/or one of the offer buttons in the guide 766, the third screen may be presented to the viewer. The description information window 770 may include a description of the product and/or service being purchased. The third screen 759 may include other product and/or service information.

In a fourth display screen 780, shipping, billing and/or payment information is shown. After the viewer clicks on the buy button 776, the fourth screen 780 may be presented to the viewer. The fourth screen 780 may include a shipping window 782 and a billing and/or payment window 784. The shipping window 782 includes shipping information, such as customer address information. The billing and/or purchasing window 784 may include account information to which one of the backend devices may bill the customer for the purchased product and/or service.

FIG. 17 illustrates a MPEG-2 TS packet format. The MPEG-2 TS packet format may include various fields, such as a table ID field 800, a section index indicator field 802, a private indicator field 804, a reserved bits field 806, a private section length field 808, a table ID extension field 810, a version number field 812, a current next indicator field 814, a section number field 816, a last section number field 818, a N private data field 820, and cyclical redundancy check (CRC) bits field 822. The N private data field 820 may include N bits and other fields, such as a unique ID field 824, a title field 826, a display start time field 828, a display end time field 830, a price field 832, a URL field 834, a display duration field 836, secondary order method (or information) field 838, a description field 840, a next event indicator field 842 and a private data CRC field 844. If the corresponding user receiving device is not connected to the Internet, cannot communicate with a satellite, and/or is unable to communicate back to a service provider via another network, the secondary order information may provide, for example, a phone number to call and/or a URL of a website to place an order. The corresponding mobile device may then be used to make a phone call and/or open the website to place the order and/or inquire about the corresponding product and/or service available for purchase. The secondary order information field 838 may indicate a type of secondary method to use to place the order and/or inquire about the product and/or service. The display times and/or durations 828, 830, 836 may be in units-of-measure associated with a video (e.g., a MPEG video), such as a frame number and/or quantity of frames. The display times and/or durations 828, 830, 836 may be based on timestamp increments of the video.

As an example, a movie being played out may show an actor wearing a bracelet. The private data, provided with the frames of video showing the actor wearing the bracelet, may contain the data with the URL for a website to purchase the bracelet. The private data has information of when to present a dialogue window (having a description that defines the purchasable product) on a display and how log to present the dialogue window. The dialogue window may have buttons for inquiring about the product. If a user clicks on a button to inquire about the product, the video may be paused and a browser (e.g., Internet browser) may be opened for the URL on a display of a user receiving device, a mobile device, and/or computer. The user may then purchase the product by interacting with the user receiving device, a mobile device, and/or computer.

The N private data field 820 and/or the private data CRC field 836 may include private section information, as described above. The private section information may indicate to a user receiving device when and how long to display a description dialogue window and an offer. The private section information may also include a product and/or service description to include in a dialogue window. The private section information may indicate locations in frames and/or timing (e.g., identifiers of key frames) of products and/or services in videos.

Figure 18:
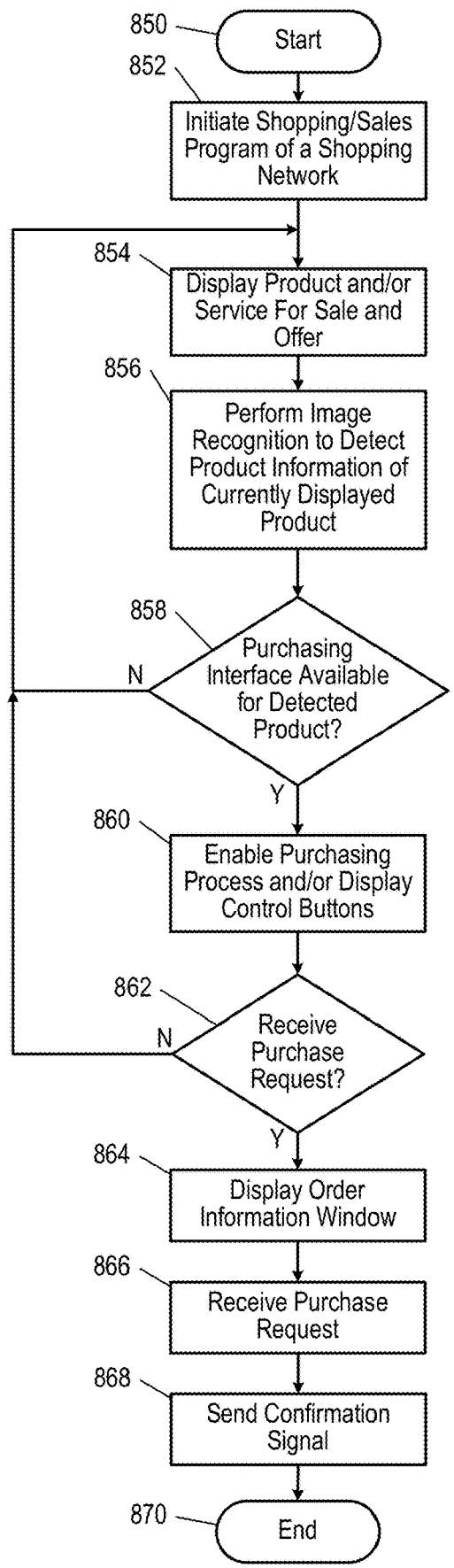
FIG. 18 illustrates a shopping network recognition method in accordance with the present disclosure.

The systems disclosed herein may be operated using numerous methods, an example method is illustrated in FIG. 18. Although the following tasks of FIG. 18 are primarily described with respect to the implementations of FIGS. 1-17, the tasks may be easily modified to apply to other implementations of the present disclosure. The tasks may be iteratively performed and may be implemented via software and/or hardware corresponding to the disclosed modules. In FIG. 18, a shopping network recognition method is shown. Although the tasks of FIG. 18 are described with respect to certain modules, servers and/or devices, the tasks of FIG. 18 may be performed by control modules and/or other modules of a mobile device, a user receiving device, a content provider, a head end, a content service provider, an advertiser, a product and/or service provider, and/or other device. The mobile device, user receiving device and content provider described below with respect to the tasks of FIG. 18 may refer to any mobile device, user receiving device and/or content provider disclosed herein.

Figure 19:
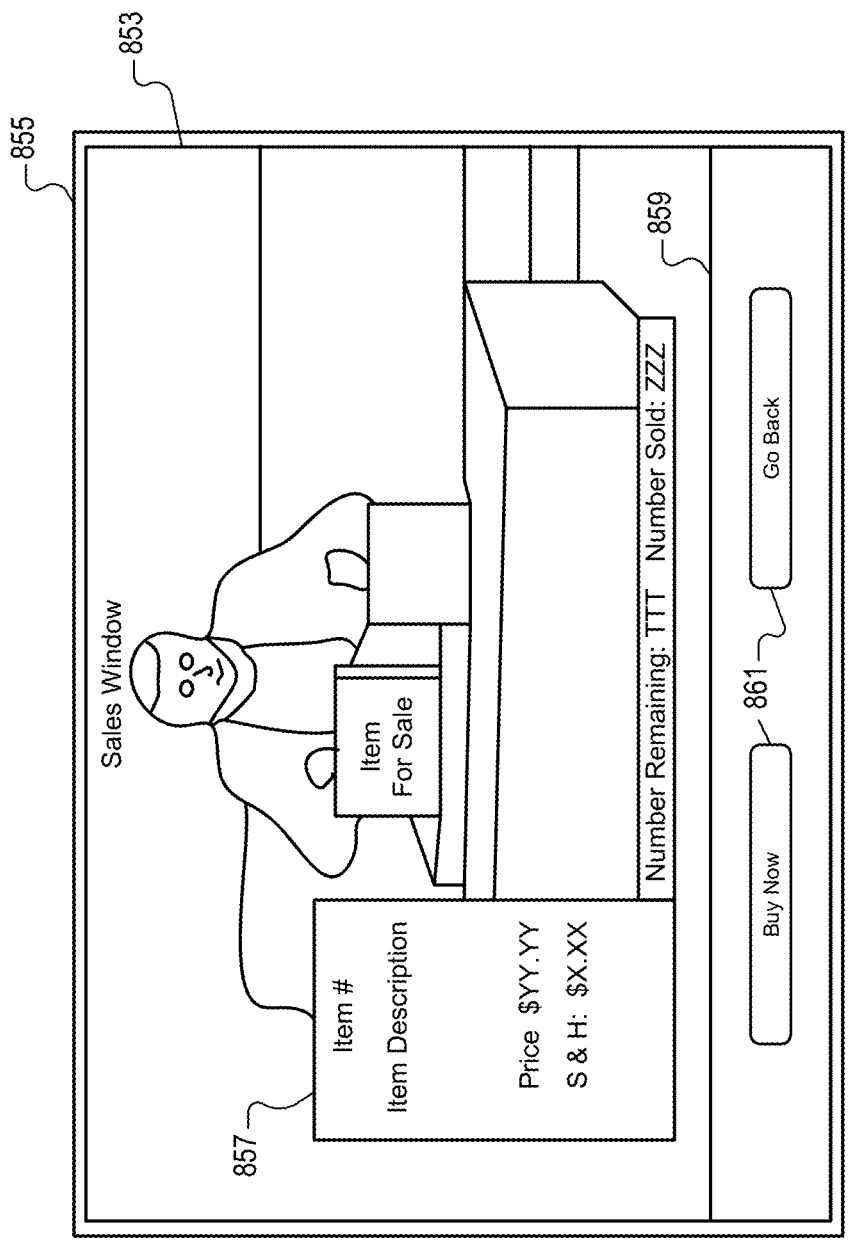
FIG. 19 is a screen including a sales window in accordance with the present disclosure.

The method may begin at 850. Although the following tasks are primarily described with respect to a shopping network, an infomercial, and/or channel, the following tasks may be applied to other program networks and/or channels. At 852, a user via a mobile device and/or a user receiving device may select a shopping and/or sales program, an infomercial, and/or a shopping network (or channel). An example of a shopping network is the Home Shopping Network (HSN®). This may include the mobile device receiving an input from the user and generating a channel selection signal. The channel selection signal may be transmitted from the mobile device to the user receiving device. The user receiving device may then select and/or tune to the selected channel. The user receiving device may then display the channel on a display connected to the user receiving device. FIG. 19 shows a screen 853 on a display 855 illustrating an example program on a shopping network channel.

At 854, the channel being viewed on the display of the user receiving device may display a product and/or service that is being offered for sale and the corresponding offer (e.g., price, quantity, hourly rate, ID number of product or service, description of product or service, shipping and handling costs, etc.). Displaying a service refers to displaying information and/or a description pertaining to the service being offered. The offer may be shown in an offer box (or window). An example offer box 857 is shown in FIG. 19.

At 856, the user receiving device (or module thereof) performs image recognition on the images (or frames) of the program being displayed to detect the offer box and/or contents shown in the offer box and/or other displayed information. As an example, this may be performed by a control module, a transaction module and/or an image recognition module of the user receiving device. This allows the user receiving device to detect information regarding a product and/or service being offered for sale. The determination of whether a product and/or service is being offered for sale may also be based on other information, such as: the channel being watched; a time of day; a layout, style, font, and/or location of a screen that the offer box is located; other information displayed on the screen; etc. The other information may include, for example, a number (or quantity) of a product and/or a service contract that remain available to purchase, a phone number, a remaining amount of time available to purchase the product and/or service, a number (or quantity) sold of the product and/or service, etc.

At 858, the control module or other module of the user receiving device determines whether there is a purchasing interface available between the user receiving device and a backend device to allow a transaction for the item being offered for sale to be purchased. The purchasing interface may refer to an interface between the user receiving device and one or more backend devices (e.g., an advertiser, a payment service provider, and/or a product and/or service provider). The purchasing interface may be available when a previous arrangement has been made to allow a user receiving device to communicate with the backend device to initiate, verify, complete and confirm a transaction for the product and/or service being offered for sale.

At 860, if a purchasing interface is available, the control module or other module of the user receiving device may enable purchasing of the product and/or service by the user. This may include displaying a control window 859 having one or more control buttons 861, as shown in FIG. 19. The control buttons 861 may include a "Buy Now" button and "Back" button. Results of the image recognition performed at 856 and/or the availability of the purchasing interface triggers the control window 859 (or purchase scroll bar) to be opened.

Figure 20:
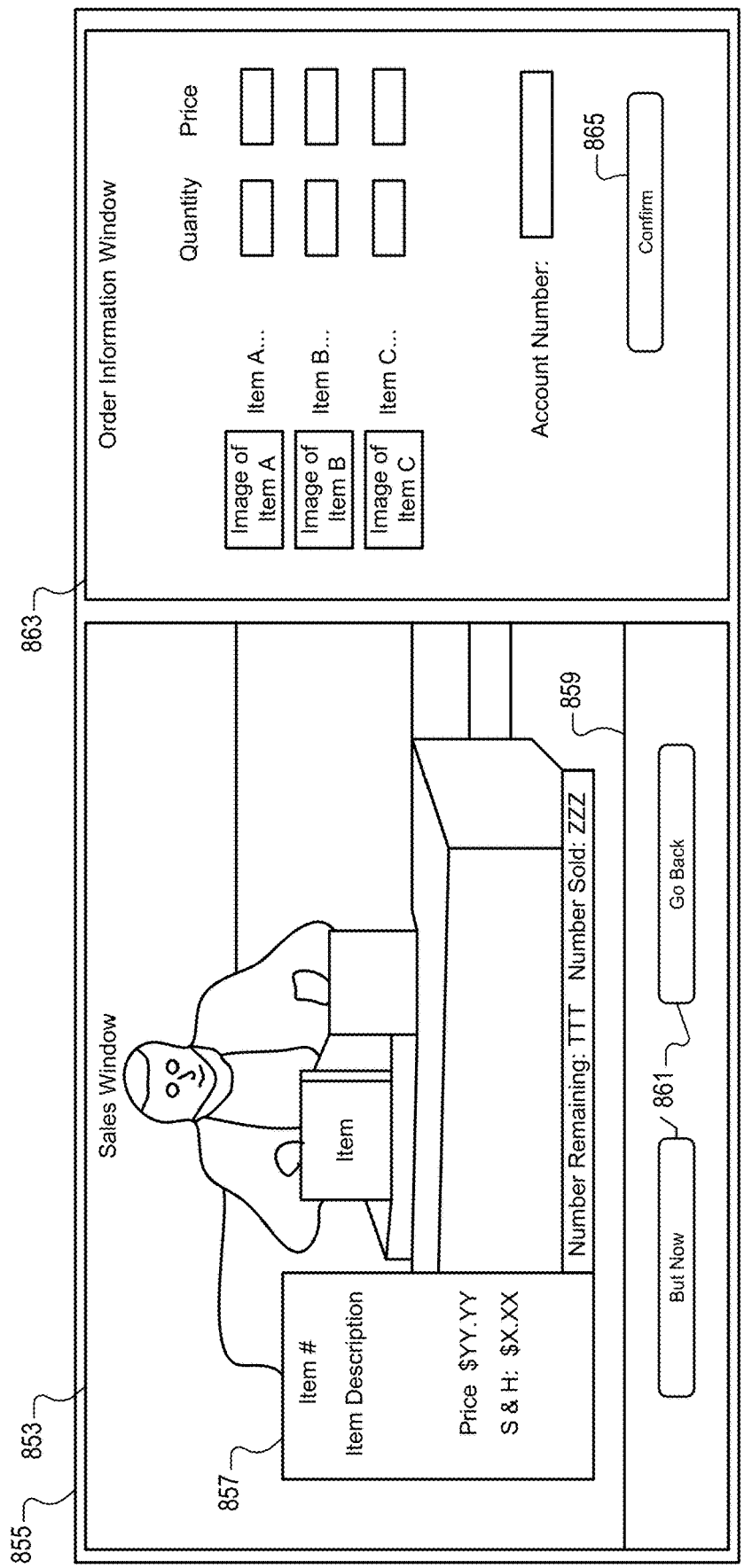
FIG. 20 is a screen including the sales window of FIG. 18 and an order information window in accordance with the present disclosure.

The Buy Now button may open a dialogue window 863 (or pop-up screen) for purchasing the product and/or service. The dialogue window 863 may include and confirm purchasing details and allow the user to select a payment method. The Back button may close the control window 859. An example of the dialogue window 863 is shown in FIG. 20. The dialogue window 863 in FIG. 20 is shown as an order information window. The dialogue window 863 may include a list of items being purchased, quantities of the items being purchased, and prices of the items being purchased. The dialogue window 863 may also include account information and a confirm button 865. The order information window 863 may be generated based on information form a payment service provider (e.g., PayPal® or iPay™). An account number displayed and/or entered in the order information window may be a customer unique account number for the payment service provider.

At 862, if interested in the product and/or service, the user may click on the Buy Now button or perform another action to triggering opening of the dialogue window. The mobile device may generate a purchase request signal based on the user input. The purchase request signal may be transmitted from the mobile device to the user receiving device. The purchase request signal may indicate to the user receiving device that the user is interested in the product and/or service being offered. In another embodiment, the user is able to highlight or move a cursor over the Buy Now button and click via the mobile device on the Buy Now button. The clicking, pressing a button on the mobile device, performing a swipe gesture on the mobile device, and/or performing other action on the mobile device causes the mobile device to signal to the user receiving device that the user is interested in the product and/or service. If the user provides an input indicating interest in the product and/or service, task 864 is performed, otherwise task 854 may be performed.

At 864, the control module, output module and/or other module of the user receiving device opens and displays the dialogue window, which may be shown next to the program being watched. To step forward to a more interactive experience, a payment service provider portal (or merchant online payment service) may be opened as a window on the display of the user receiving device to allow the user to quickly purchase items from the shopping network.

At 866, the user may interact with the dialogue window to cause a purchase request to be generated. This may include the user providing various inputs including: selecting products and/or services; quantities of the products; requesting additional information with respect to the products and/or services; selecting and/or entering billing and shipping information; selecting and/or entering payment information; and/or selecting, entering and/or requesting other information pertaining to the products and/or services being offered for sale. The mobile device and/or the user receiving device may generate a purchase request, which may be stored and/or transmitted to one or more backend devices to indicate the information shown and agreed to by the user in the dialogue window. In one embodiment, the user may only need to enter a user name, a password, and/or answer one or more security questions to complete and confirm the transaction. The security questions may be previously selected and/or input by the user via the mobile device and/or the user receiving device.

At 868, the user may click on the Confirm button 865 to complete and confirm an order via the mobile device. The mobile device may send: a confirmation request signal to the user receiving device; a signal indicating the Confirm button has been clicked on; and/or other signal indicating that the order has been confirmed by the user. In another embodiment, the user is able to highlight or move a cursor over the Confirm button 865 and click via the mobile device on the Confirm button 865. The clicking, pressing a button on the mobile device, performing a swipe gesture on the mobile device, and/or performing other action on the mobile device causes the mobile device to signal to the user receiving device that the user has confirmed the purchase. The method may end at 870.

In one embodiment, when the offer box and/or other information regarding a product and/or service is no longer being shown on the display of the user receiving device, the user receiving device may remove the control window and/or control buttons. This may be based on image recognition. The control window and/or the dialogue window may also be closed when an order has been confirmed.

The above-described method may be performed via software and/or hardware located on the user receiving device, the mobile device, and/or one or more of the backend devices. The displaying of buttons to be clicked on by the user may be part of an application stored in the user receiving device, the mobile device, and/or may be integrated into the program being displayed.

The above-described method allows users to quickly purchase products and/or services via user receiving devices and televisions based on triggered image recognition rather than via special user interfaces per offer. Instead of calling a vendor and/or a shopping network via a telephone and/or visiting a website of the vendor and/or shopping network via a computer, a user may purchase products and/or services via user receiving devices while watching a corresponding program on a television. This serves as a solution to bring the vendor and user one step closer to each other with a simple and secure solution. By utilizing a payment service provided by a payment service provider, users do not have to input their personal data (e.g., credit card number, social security number, address, etc.), as this information may already be stored at the payment service provider. The user may simply provide a user unique ID number and/or payment service provider account number, which may be forwarded from the user receiving device and/or the mobile device to the payment service provider for verification purposes. The payment service provider may then send a verification response signal back to the user receiving device and/or mobile device indicating that the user has been verified and is able to proceed with completing and confirming the purchase.

The above-described method may include a firmware/software program that allows users to make their purchases from an application embedded into the firmware/software program that is triggered by a module executing image recognition software. The image recognition software is used to monitor images being displayed and if information and/or objects are detected that indicate a purchasable item is being displayed, then a set of criteria may be displayed on the television screen (such as an item number, price, and period-to-purchase). The firmware/software program may trigger purchase buttons to be displayed at the bottom (or other part) of the screen. Once the purchasable item(s) are no longer displayed, the application of the corresponding user receiving device or mobile device no longer displays the purchase buttons.

Figure 21:
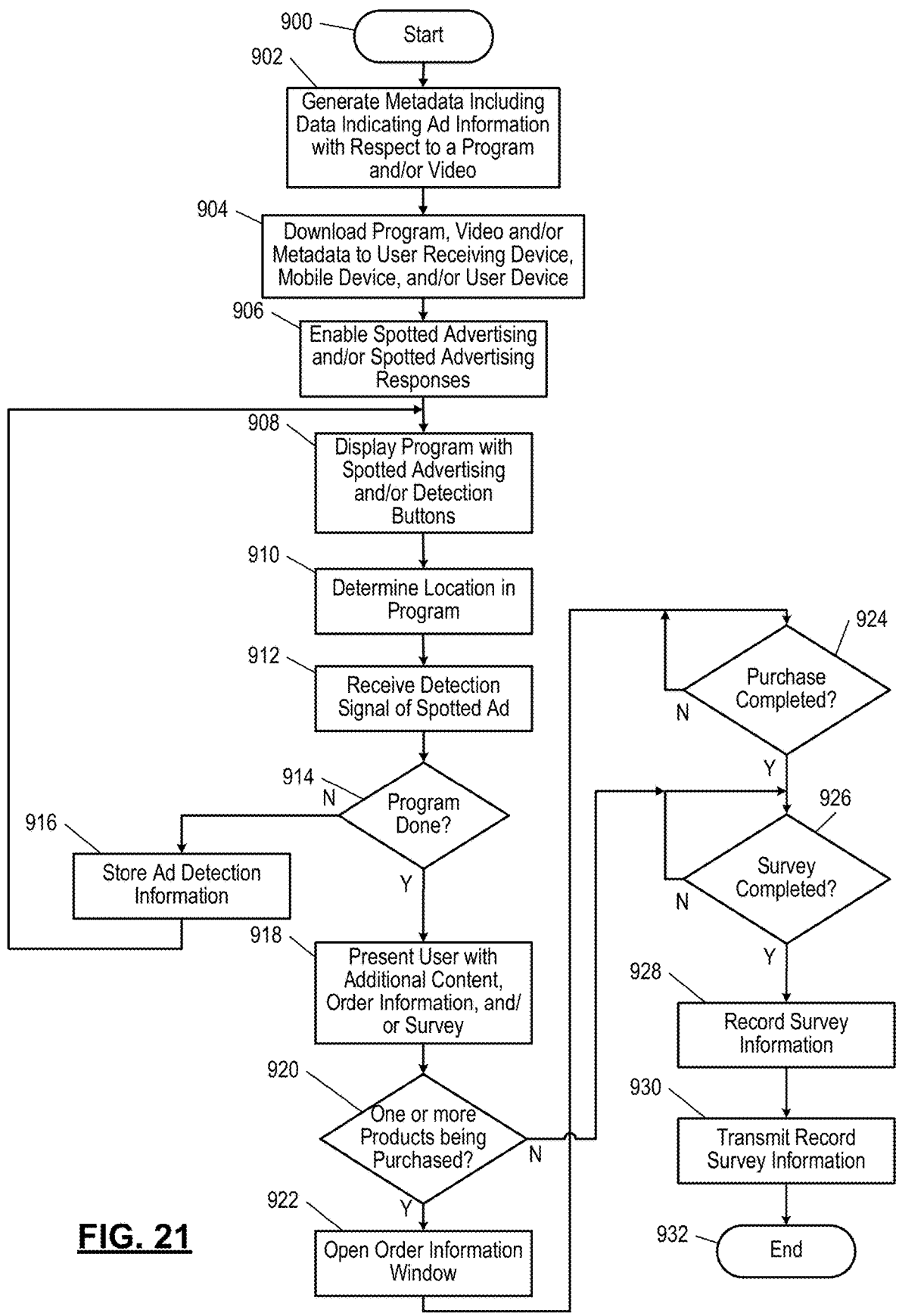
FIG. 21 illustrates a spotted advertising method in accordance with the present disclosure.

The systems disclosed herein may be operated using numerous methods, an example method is illustrated in FIG. 21. Although the following tasks of FIG. 21 are primarily described with respect to the implementations of FIGS. 1-20, the tasks may be easily modified to apply to other implementations of the present disclosure. The tasks may be iteratively performed and may be implemented via software and/or hardware corresponding to the disclosed modules. In FIG. 21, a spotted advertising method is shown. Although the tasks of FIG. 21 are described with respect to certain modules, servers and/or devices, the tasks of FIG. 21 may be performed by control modules and/or other modules of a mobile device, a user receiving device, a content provider, a head end, a content service provider, an advertiser, a product and/or service provider, and/or other device. The mobile device, user receiving device and content provider described below with respect to the tasks of FIG. 21 may refer to any mobile device, user receiving device and/or content provider disclosed herein.

The method may begin at 900. At 902, a backend device (e.g., an advertiser, a payment service provider, a content provider, and a product and/or service provider) may generate metadata. The metadata may indicate where products, service indications, and/or ad information are displayed in a program and/or video. The metadata may include times (e.g., frame number) and/or locations in frames (or images) where the products, service indications, and/or ad information are shown. The service indications refer to items in a program and/or video, which indicate a purchasable service. As a few examples, this may include: an actor or actress referring to a particular service; a family watching an ad for a service and commenting on the service; a trademark for a particular service company being shown; etc. The program and/or video may, for example, include: a person drinking a beverage (which may be purchasable); a person wearing a clothing article (which may be purchasable); a person driving a certain vehicle (which may be purchasable); etc. Various products and/or services may be shown throughout a program and/or video which a viewer may be interested in purchasing. The products and/or services may be shown or audible phrases and/or indications may be heard during playout of the program and/or video with respect to the products and/or services. The video and/or audio playout of images and/or indications are referred to herein as "spotted advertising". A program and/or video that includes video and/or audio playout of the images and/or indications for products and/or services may be referred to respectively as "a spotted enabled program" and "a spotted enabled video".

The following tasks 904, 906, 908 may be performed in a different order and/or during a same period of time. At 904, the one or more backend devices download the program, video and/or metadata to the user receiving device and/or mobile device. The user receiving device and/or mobile device may then playout the program and/or video and monitor the metadata.

At 906, the user receiving device and/or mobile device may indicate to a viewer that the program and/or video is a spotted ad program or a spotted ad video. This may be done by displaying an icon, banner, and/or other indicator on a display of the user receiving device and/or the mobile device. The indication may be superimposed over the program and/or video. The program and/or video may have an indicator integrated into the program and/or video, which is displayed to the viewer during playout of the program and/or video. The user receiving device and/or the mobile device may automatically enable spotted advertising and/or spotted advertising responses or the viewer may enable via the mobile device spotted advertising and/or spotted advertising responses. Certain spotted advertising may not be shown during playout of the program and/or video if spotted advertising is disabled. The user may open a dialogue window on the mobile device and/or click on a button on the mobile device to enable spotted advertising and/or spotted advertising responses. The enabling of spotted advertising responses allows a user to spot a product and/or service in a program and/or video and (i) indicate to a user receiving device and/or a backend device that the user spotted the product and/or service, (ii) inquire about the product and/or service via the user receiving device and/or the mobile device, and/or (iii) purchase the product and/or service via the user receiving device and/or mobile device. Disabling spotted advertising responses prevents a user from accidentally causing a spotted response to be sent from a mobile device to a user receiving device.

At 908, the program and/or video, if not already being displayed, may be displayed with spotted advertising. In one embodiment, a spotted advertising window and/or corresponding buttons may be displayed on the display of the user receiving device and/or on the mobile device to allow the user to click on a button and/or perform some other action to indicate detection of a spotted ad. In another embodiment, the user is able to highlight or move a cursor over an item in the program and/or video and click a button or perform some other action to select the item.

At 910, the user receiving device and/or mobile device may determine a location in a program and/or video of a spotted ad based on the metadata. The user receiving device and/or mobile device may alter a portion of an image, as described above, or provide some other indication to the viewer that a spotted ad is being shown. This alerts the viewer of the spotted ad. In one embodiment, no indication is provided. This allows an advertiser to determine whether a user is able to spot a spotted ad without an indication. Indications may be provided for a period of time, as a teaching method, to teach a user of how and when spotted ads may be incorporated into a program and/or video.

The user receiving device and/or the mobile device may send and/or generate text messages, emails, and/or on-screen alerts. The text messages, emails and/or alerts may be sent and/or generated prior to and/or during the program and/or video to indicate to the user that: the program and/or video includes spotted ads; the user missed a spotted ad; and/or certain spotted ads are being displayed. The text messages, emails, and/or alerts may be transmitted from the user receiving device to the mobile device. The text messages, emails, and/or alerts may ask the user whether the user is interested in the product and/or service referred to in the spotted ad that was missed.

At 912, the mobile device may generate a detection signal based on an input from the viewer. The detection signal indicates that the viewer spotted a spotted ad in the program and/or video. The mobile device may transmit the detection signal to the user receiving device.

At 914, the user receiving device may determine whether playout of the program and/or video is done. If the program and/or video is done, task 918 is performed, otherwise task 916 may be performed.

At 916, ad detection information may be stored at the user receiving device, the mobile device, and/or in other memory accessible to the user receiving device, the mobile device and/or a backend device. The other memory may be, for example, the memory in the cloud server of FIG. 1. The detection information may include: a time within the program or video that the spotted ad is shown; a frame number in which the spotted ad is located; a location (e.g., coordinates) within a frame (or image) of the program and/or video where the spotted ad is shown; a duration of the ad; a viewer ID number or other viewer information; a mobile device ID number; an ID of the product and/or service shown; etc. The program and/or video may continue to playout while the detection information is stored.

At 918, the user receiving device and/or mobile device may open a dialogue window to: allow the viewer to purchase the products and/or services detected; allow the viewer to request and/or obtain additional information with regard to the products and/or services detected and/or other related products and/or services; to select, enter, and/or confirm order information; and/or present the viewer with a survey. The control modules of the user receiving device and/or mobile device may display the survey questions on corresponding displays. The survey may ask the viewer: about the program, video and/or spotted ads; likes and/or dislikes of the viewer with respect to the spotted ads; whether the viewer detected certain spotted ads; if the viewer has a preference as to whether spotted ads should be included in a program and/or video; and/or other questions. The questions directed to the spotted ads may inquire about whether the ads were a deterrence, noticeable, enjoyable, or had no effect on the viewer's viewing experience.

At 920, the user receiving device and/or the mobile device may determine whether the viewer is purchasing a product and/or service. If a product and/or service is being purchased, task 922 is performed, otherwise task 926 may be performed. At 922, the user receiving device and/or mobile device may open a dialogue window (e.g., an order information window) to allow the user to select, enter and/or confirm order information.

At 924, the user receiving device and/or mobile device determines whether a purchase is completed. Task 926 may be performed when the purchase is completed. At 926, the user receiving device and/or mobile device determines whether the survey has been completed. Task 928 may be performed when the survey has been completed. In one embodiment tasks 918 and/or 928 are not performed (or skipped).

At 928, survey information may be recorded in memory. The memory may be in the user receiving device and/or mobile device and/or elsewhere (e.g., the memory in the cloud server). The survey information may include the survey questions and the answers to the survey questions, as provided by the viewer.

At 930, the user receiving device and/or mobile device may transmit the survey information to one or more backend devices for evaluation purposes. As an example, an advertiser may cancel and/or modify previously generated spotted ads based on the answers to the survey questions. The advertiser may generate new spotted ads based on: the answers to the survey questions; a history of programs watched by the user; a history of products and/or services inquired about and/or purchased by the user; demographics of the user; and/or data mining. Data mining may include searching for similar programs, videos, products, and/or services watched and/or purchased by other users in a same or similar demographic as the user. The advertiser may select spotted ads to include based on the traffic and/or number of purchases generated for that spotted ad by the user and/or other users. The method may end at 932.

The above-described method allows a user that while watching a program notices an advertisement/product placement in the context of the program to indicate to a user receiving device detection of the advertisement/product placement by the user. The user receiving device and/or mobile device may provide the user with: additional information regarding the ad and/or product placement; other products; and an "award" for detecting one or more spotted ads and/or for completing a survey. As an example, if the user detects a predetermined number of spotted ads within a predetermined time period and/or within a program and/or video, the user may be provided with a discount on services provided by the content provider and/or a discount on the product and/or service being offered. This may be based on communication with a backend device (e.g., the advertiser). As another award example, the user may be provided with an entry in a raffle with a chance to win another prize.

The user is able to provide feedback, which may then be used for subsequently broadcasted and/or generated programs, ads and/or videos. The user receiving device and/or mobile device is able to directly and/or indirectly collect data about the user's interaction with the program and/or video being watched. This provides advertisers with insight into an advertising demographic of the user and allows the advertiser to measure user metrics. The stated information also provides advertisers with the ability to continue to target users that identify with certain spotted ads. The advertiser may then gauge the user's interpretation of the placement of the spotted ad.

The spotted ads also allow ads to be integrated into programs and/or videos for more real life examples of the products and/or services being offered. This provides an emotional advantage over traditional advertising, which is often played out during interruptions in a program and/or video. Due to the inclusion of spotted ads in programs and/or videos, the program and/or video may not be interrupted to playout a tradition ad. This improves the viewer's experience and minimizes playout of ads that are not directed to the specific user. A backend device and/or advertiser may tailor spotted ads to be used in certain programs and/or videos typically watched by a certain user demographic group. The users in the user demographic group may typically watch certain programs and/or videos and may be interested in certain products and/or services.

The above-described method includes a mobile device being synchronized to a program and/or video being playout on a display of a user receiving device. The mobile device may monitor metadata associated with the program and/or video and may allow the user to interact with the program and/or video to identify, select, and/or click on spotted ad items shown and/or audibly played out during the video. When the spotted ad is audibly played out and there is not corresponding video content, the user may click anywhere on the video, perform a swipe gesture on the mobile device, or perform some other task to provide the mobile device with an input indicating that the user detected the spotted ad.

The above-described method allows ads to be integrated into programs and/or videos such that the ads may be viewed each time the program and/or video is played out. Also, since the spotted ads are integrated into the program and/or video, the spotted ads may not be easily skipped over by a user, mobile device, and/or user receiving device. This is unlike traditional ads (or commercials) that are played out during interruptions in a program, which can be skipped and/or deleted by a user receiving device. The spotted ads may be seamlessly blended into programs and/or videos without the programs and/or videos being interrupted by advertisements (or commercials).

The above-described tasks of FIGS. 10, 18 and 21 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The above-disclosed content providers, head ends, service providers, advertisers, product and/or service providers, payment service providers and/or backend devices may include and/or be implemented as respective servers. The servers may include respective control modules for performing one or more of the corresponding tasks and/or functions disclosed herein.

The wireless communications described in the present disclosure with respect to Bluetooth transceivers of user receiving devices and mobile devices may include transmission of data and/or signals having short-wavelength ultra-high frequency (UHF) radio waves in an industrial, scientific and medical (ISM) radio frequency band from 2.4 to 2.485 GHz. The signals may be transmitted based on Bluetooth protocols and/or standards. The signals may be transmitted based on Bluetooth low energy (or smart) protocols and/or standards. The Bluetooth transceivers may include respective antennas.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

A content or service provider is also described herein. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure the transfer of video, programs, or channel information may include and is not limited to the transfer of data, content, information, programs, movie trailers, movies, advertising, assets, video data, etc.

As used herein, the term "title" will be used to refer to, for example, a movie itself and not the name of the movie. While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A user receiving device comprising:
   at least one transceiver module that receives a video and an ad, wherein the ad is played out as part of the video;
   an output module that displays the video and the ad on a display, wherein the display is associated with the user receiving device, wherein the ad is for a current product or service currently being displayed; and
   a transaction module that
      initiates a purchase transaction for the current product or service based on an initiation signal,
      after initiating the purchase transaction, displays an additional offer based on the current product or service and a plurality of channels watched of a stored customer history,
      generates an offer response to the additional offer; and
      receives a confirmation response based on the offer response.

2. The user receiving device of claim 1, wherein the stored customer history comprises a plurality of previously watched programs or offers accepted, or both.

3. The user receiving device of claim 1, wherein the stored customer history corresponds to at least one of demographic data and psychographic data.

4. The user receiving device of claim 1, wherein the stored customer history corresponds to items purchased.

5. The user receiving device of claim 1, wherein the stored customer history corresponds to advertisements for which offers were accepted.

6. The user receiving device of claim 1, wherein the stored customer history corresponds to donations made.

7. The user receiving device of claim 1, wherein the stored customer history corresponds to a period of time a customer watches television or videos.

8. The user receiving device of claim 1, wherein a control module displays an indicator on the display to indicate that the ad is being displayed.

9. The user receiving device of claim 1, wherein the output module generates an audible output corresponding to the product or service.

10. The user receiving device of claim 1, wherein the output module generates a banner or icon comprising the ad.

11. The user receiving device of claim 1, wherein the output module integrates an indicator into the video indicating an ad.

12. The user receiving device of claim 1, wherein a control module displays a transaction button on the display for the ad.

13. The user receiving device of claim 1, wherein the transaction module initiates the purchase transaction when the video is done.

14. The user receiving device of claim 1, wherein a control module initiates a purchase after playout of the video.

15. A system comprising:
   a user receiving device comprised:
   at least one transceiver module that receives a video and an ad, wherein the ad is played out as part of the video;
   an output module that displays the video and the ad on a display, wherein the display is associated with the user receiving device, wherein the ad is for a current product or service currently being displayed; and
   a transaction module that
      initiates a purchase transaction for the current product or service based on an initiation signal,
      after initiating the purchase transaction, displays an additional offer based on the current product or service and a plurality of channels watched of a stored customer history,
      generates an offer response to the additional offer, and
      receives a confirmation response based on the offer response; and
   a mobile device generating the initiation signal.

16. The system of claim 15, wherein the mobile device receives a text message or email that the video includes ads for purchasing the product or service.

17. The system of claim 15, wherein the mobile device receives a text message or email that a certain product is being displayed in the video.

18. A method of operating a user receiving device comprising:
   receiving a video and an ad wherein the ad is played out as part of the video, wherein the ad is for a product or service;
   displaying the video and the ad on display wherein the display is associated with the user receiving device, wherein the ad is for a current product or service currently being displayed;
   initiating a purchase transaction for the current product or service based on an initiation signal;
   after initiating the purchase transaction, displaying an additional offer based on the current product or service and a plurality of channels watched of a stored customer history,
   generating an offer response to the additional offer; and
   receiving a confirmation response based on the offer response.

19. The method of claim 18, wherein the stored customer history comprises a plurality of previously watched programs, or offers accepted, or both.

* * * * *